(12) United States Patent
Gerhards et al.

(10) Patent No.: US 10,291,965 B2
(45) Date of Patent: May 14, 2019

(54) TELEVISION RECEIVER AUTHORIZATION OVER INTERNET PROTOCOL NETWORK

(71) Applicant: DISH Technologies L.L.C., Englewood, CO (US)

(72) Inventors: Keith Gerhards, Parker, CO (US); Danny J. Minnick, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/068,271

(22) Filed: Mar. 11, 2016

(65) Prior Publication Data

US 2017/0264965 A1    Sep. 14, 2017

(51) Int. Cl.
*H04N 21/6334*   (2011.01)
*H04N 21/61*   (2011.01)
(Continued)

(52) U.S. Cl.
CPC ... *H04N 21/6334* (2013.01); *H04N 21/25875* (2013.01); *H04N 21/42684* (2013.01);
(Continued)

(58) Field of Classification Search
CPC ............. H04N 21/2351; H04N 21/258; H04N 21/25816; H04N 21/25841;
(Continued)

(56) References Cited

U.S. PATENT DOCUMENTS

| | | | | |
|---|---|---|---|---|
| 5,621,793 | A | * | 4/1997 | Bednarek ............... G01S 19/14 348/E7.056 |
| 6,023,762 | A | * | 2/2000 | Dean ...................... G06F 21/34 380/255 |

(Continued)

OTHER PUBLICATIONS

International Search Report and Written Opinion for PCT/US2017/021034 dated Jun. 1, 2017, all pages.

(Continued)

*Primary Examiner* — An Son P Huynh
(74) *Attorney, Agent, or Firm* — Kilpatrick Townsend & Stockton LLP

(57) ABSTRACT

Embodiments described herein provide various techniques for programming and authorizing television receivers and other subscriber equipment via Internet Protocol (IP) networks. In some embodiments, a television receiver device (e.g., a satellite television receiver, cable television receiver, etc.) may detect and establish a connection to an IP network. After connecting to an IP network, the receiver may transmit identification data to a backend computer server of a cable or satellite television provider. The backend server may use the receiver identification data to determine television subscription(s) associated with the receiver and/or customer, and may determine and transmit one or more authorization codes back to the television receiver over the IP network. The television receiver may use the authorization codes to program the receiver device to decode and output the television channels and programs corresponding to the subscription.

19 Claims, 10 Drawing Sheets

(51) Int. Cl.
  *H04N 21/643* (2011.01)
  *H04N 21/84* (2011.01)
  *H04N 21/258* (2011.01)
  *H04N 21/426* (2011.01)
  *H04N 21/45* (2011.01)
  *H04N 21/462* (2011.01)
  *H04N 21/235* (2011.01)

(52) U.S. Cl.
  CPC ..... H04N 21/4532 (2013.01); H04N 21/4622 (2013.01); H04N 21/6143 (2013.01); H04N 21/64322 (2013.01); H04N 21/84 (2013.01); *H04N 21/2351* (2013.01)

(58) Field of Classification Search
  CPC ....... H04N 21/25875; H04N 21/25891; H04N 21/266; H04N 21/26606; H04N 21/26613; H04N 21/418; H04N 21/4181; H04N 21/4182; H04N 21/4185; H04N 21/4623; H04N 21/47211; H04N 21/6143; H04N 21/6193; H04N 21/6334; H04N 21/63345; H04N 21/64322
  See application file for complete search history.

(56) References Cited

U.S. PATENT DOCUMENTS

| | | | |
|---|---|---|---|
| 6,584,199 B1 * | 6/2003 | Kim | H04N 7/163 348/E7.056 |
| 6,775,267 B1 * | 8/2004 | Kung | H04L 12/14 370/352 |
| 7,530,085 B2 * | 5/2009 | Tsuria | H04N 7/165 725/25 |
| 8,185,927 B2 * | 5/2012 | Karaoguz | H04N 21/235 725/105 |
| 8,458,745 B2 * | 6/2013 | Shanks | H04H 60/31 725/14 |
| 9,203,629 B2 * | 12/2015 | Momtahan | G06Q 30/00 |
| 9,219,607 B2 * | 12/2015 | Nakhjiri | H04L 9/321 |
| 9,538,232 B2 * | 1/2017 | Carney | H04N 21/4331 |
| 9,681,165 B1 * | 6/2017 | Gupta | H04N 21/2541 |
| 9,742,560 B2 * | 8/2017 | Simon | H04L 9/0836 |
| 2002/0056002 A1 * | 5/2002 | Charas | G06Q 20/085 709/226 |
| 2002/0087873 A1 * | 7/2002 | Zunke | G06F 21/123 713/193 |
| 2002/0090090 A1 * | 7/2002 | Van Rijnsoever | H04N 7/1675 380/279 |
| 2002/0174430 A1 * | 11/2002 | Ellis | G11B 27/005 725/46 |
| 2002/0178446 A1 * | 11/2002 | Sie | H04N 21/8549 725/32 |
| 2003/0061477 A1 * | 3/2003 | Kahn | H04N 7/1675 713/150 |
| 2003/0097655 A1 * | 5/2003 | Novak | G06Q 20/3821 725/31 |
| 2003/0126595 A1 * | 7/2003 | Sie | G06Q 30/02 725/29 |
| 2003/0149883 A1 * | 8/2003 | Hopkins | G06F 21/86 713/191 |
| 2003/0149988 A1 * | 8/2003 | Ellis | H04N 5/44543 725/87 |
| 2004/0088262 A1 * | 5/2004 | Boucher | G06Q 20/367 705/65 |
| 2005/0028208 A1 * | 2/2005 | Ellis | H04N 7/163 725/58 |
| 2005/0033692 A1 * | 2/2005 | Jarman | G06Q 20/02 705/41 |
| 2005/0114272 A1 * | 5/2005 | Herrmann | A63F 13/338 705/67 |
| 2005/0229212 A1 * | 10/2005 | Kuether | H04N 5/44543 725/58 |
| 2006/0020960 A1 * | 1/2006 | Relan | G06F 17/30017 725/30 |
| 2006/0064383 A1 * | 3/2006 | Marking | G06Q 20/3829 705/57 |
| 2006/0123451 A1 * | 6/2006 | Preisman | H04N 7/17318 725/86 |
| 2006/0236245 A1 * | 10/2006 | Agarwal | G11B 27/034 715/716 |
| 2007/0154163 A1 * | 7/2007 | Cordray | H04N 5/782 386/278 |
| 2007/0157281 A1 * | 7/2007 | Ellis | H04N 7/17309 725/134 |
| 2007/0240193 A1 * | 10/2007 | Sie | H04N 7/17318 725/88 |
| 2008/0059993 A1 * | 3/2008 | Jia | H04N 7/1675 725/31 |
| 2008/0092157 A1 * | 4/2008 | Walter | H04N 7/17354 725/25 |
| 2008/0141317 A1 * | 6/2008 | Radloff | H04N 5/44582 725/87 |
| 2008/0263600 A1 * | 10/2008 | Olague | H04N 5/44 725/58 |
| 2008/0301446 A1 * | 12/2008 | Yonge, III | H04L 12/2801 713/171 |
| 2008/0301732 A1 * | 12/2008 | Archer | H04N 21/252 725/40 |
| 2009/0125950 A1 * | 5/2009 | Chaudhry | H04H 40/90 725/64 |
| 2009/0144202 A1 * | 6/2009 | Hurry | G06Q 20/085 705/67 |
| 2009/0144417 A1 * | 6/2009 | Kisel | H04L 41/5003 709/224 |
| 2009/0153747 A1 * | 6/2009 | Grimes | H04N 21/4332 348/731 |
| 2009/0164579 A1 * | 6/2009 | Chaudhry | H04L 63/08 709/205 |
| 2009/0181662 A1 * | 7/2009 | Fleischman | H04W 8/183 455/419 |
| 2010/0017831 A1 * | 1/2010 | Newell | H04N 7/17318 725/104 |
| 2010/0130141 A1 * | 5/2010 | Newell | H04N 21/6582 455/90.1 |
| 2010/0153885 A1 * | 6/2010 | Yates | G06F 3/0482 715/841 |
| 2010/0192180 A1 * | 7/2010 | Olague | H04N 5/44543 725/42 |
| 2010/0266132 A1 * | 10/2010 | Bablani | H04N 9/0894 380/286 |
| 2010/0333137 A1 * | 12/2010 | Hamano | H04H 60/46 725/39 |
| 2011/0010735 A1 * | 1/2011 | Newell | H04N 7/20 725/31 |
| 2011/0055866 A1 * | 3/2011 | Piepenbrink | H04N 5/44543 725/40 |
| 2011/0069940 A1 * | 3/2011 | Shimy | G11B 27/105 386/296 |
| 2011/0072452 A1 * | 3/2011 | Shimy | H04N 7/163 725/25 |
| 2011/0078717 A1 * | 3/2011 | Drummond | H04N 21/4586 725/14 |
| 2011/0138064 A1 * | 6/2011 | Rieger | G06F 17/30905 709/228 |
| 2011/0154383 A1 * | 6/2011 | Hao | H04N 21/43615 725/8 |
| 2012/0047542 A1 * | 2/2012 | Lewis | H04N 21/44016 725/97 |
| 2012/0144202 A1 * | 6/2012 | Counterman | G06F 21/335 713/176 |
| 2012/0319825 A1 * | 12/2012 | Shimy | H04L 12/2818 340/12.5 |
| 2013/0046821 A1 * | 2/2013 | Alanara | H04W 52/0216 709/204 |
| 2013/0064110 A1 * | 3/2013 | Polinati | H04L 41/5035 370/252 |
| 2013/0067253 A1 * | 3/2013 | Tsuda | B60L 8/003 713/300 |

(56) References Cited

U.S. PATENT DOCUMENTS

| | | | |
|---|---|---|---|
| 2013/0173765 A1* | 7/2013 | Korbecki | H04N 21/42209 709/221 |
| 2013/0339997 A1* | 12/2013 | Farkash | H04N 21/23439 725/31 |
| 2014/0096154 A1* | 4/2014 | Ohtake | H04N 21/2585 725/31 |
| 2014/0129834 A1* | 5/2014 | Brill | H04L 9/321 713/168 |
| 2014/0181866 A1 | 6/2014 | Hall | |
| 2014/0258463 A1* | 9/2014 | Winterrowd | H04L 65/4084 709/219 |
| 2014/0323049 A1* | 10/2014 | Park | H04W 76/02 455/41.2 |
| 2014/0366079 A1* | 12/2014 | Pasdar | H04L 63/0209 726/1 |
| 2014/0379871 A1* | 12/2014 | Van Brandenburg | H04L 65/4084 709/219 |
| 2015/0012986 A1* | 1/2015 | Sun | H04W 12/06 726/6 |
| 2015/0149179 A1* | 5/2015 | Korbecki | G10L 13/00 704/260 |
| 2015/0181286 A1 | 6/2015 | Gonzalez | |
| 2015/0230004 A1 | 8/2015 | Vanduyn et al. | |
| 2015/0263916 A1* | 9/2015 | Phillips | H04L 43/08 709/224 |
| 2015/0296236 A1* | 10/2015 | Newell | H04N 7/17318 725/28 |
| 2016/0021527 A1* | 1/2016 | El Mghazli | H04W 12/04 455/435.1 |
| 2016/0132667 A1* | 5/2016 | Freitas Fortuna dos Santos | G06F 21/10 713/189 |
| 2016/0219319 A1* | 7/2016 | Servignat | H04N 21/25841 |
| 2016/0337426 A1* | 11/2016 | Shribman | H04L 65/4084 |
| 2017/0041669 A1* | 2/2017 | Duval | H04N 21/435 |

OTHER PUBLICATIONS

International Preliminary Report on Patentability for PCT/US2017/021034 dated Sep. 11, 2018, all pages.

* cited by examiner

TELEVISION RECEIVER AUTHORIZATION OVER INTERNET PROTOCOL NETWORK

BACKGROUND OF THE INVENTION

The present disclosure relates to systems and networks for providing television service to subscriber devices. For example, a typical satellite television arrangement comprises a service provider transmitting content via an antenna over a unidirectional satellite communication path to a satellite dish and satellite television receiver on or near a customer's home. Cable television systems, in contrast, may use a specialized wired infrastructure for delivering television content to television receivers and other subscriber devices. Both satellite and cable television services allow for delivery of a large volume of content (e.g., television channels, on-demand content) to subscribers' locations via their respective delivery networks. In many cases, the television content transmitted by television providers may be scrambled or otherwise encoded to prevent access by unauthorized persons or devices. Television receivers and/or other subscriber equipment may be programmed to enforce subscription policies by decoding and/or outputting only those channels for which the subscriber device is authorized to receive.

BRIEF SUMMARY OF THE INVENTION

Aspects described herein provide various techniques for authorizing television receivers and other subscriber equipment via Internet Protocol (IP) networks. In some embodiments, a television receiver device (e.g., a satellite television receiver, cable television receiver, etc.) may detect and establish a connection to an IP network, for example, during a setup and configuration process of a newly installed receiver, or during a receiver rebuild, reinstallation, or software upgrade process. After connecting to one or more IP networks, the receiver may transmit identification data to a backend computer server of a television provider. In some cases, the receiver identification data may include a receiver identifier and/or a separate smart card identifier associated with the subscriber. The backend server may use the receiver identification data to determine television subscription(s) associated with the receiver and/or customer, and may determine and transmit one or more authorization codes back to the television receiver over the IP network. The television receiver may use the authorization codes to program the receiver device to decode and output the television channels and programs corresponding to the subscription. After the television receiver is programed using the authorization codes, the receiver may receive television signals from a satellite and/or cable television provider over separate (e.g., non-IP) networks, and may descramble and output the channels and programs for which the receiver is authorized to receive.

Additional aspects described herein relate to updating authorizations for television receiver devices via IP networks, based on subscription changes and/or television viewing data collected at the receiver. For example, user inputs may be received at the television receiver in order to change a subscription package of channels received from a satellite or cable television provider. The television receiver device may transmit the changed subscription package and identification data to a backend server of the television provider via an IP network. The backend server may determine and transmit updated authorization codes back to the receiver via the IP network. In other examples, the receiver may collect and analyze television viewing data (e.g., viewing patterns, viewing habits, favorite channels and programs, etc.), and may transmit the viewing data via the IP network to the backend server. Based on the viewing data, the television provider may determine and transmit back additional authorization codes via the IP network, allowing the receiver to receive additional channels or programs targeted specifically for the viewers at the receiver. These updated and/or additional authorization codes may be received by the receiver via the IP network, and used to further program the receiver device to decode and output the modified or additional set of television channels and programs received via cable, satellite, or other non-IP networks.

BRIEF DESCRIPTION OF THE DRAWINGS

The present invention is described in conjunction with the appended figures.

Figure 1:
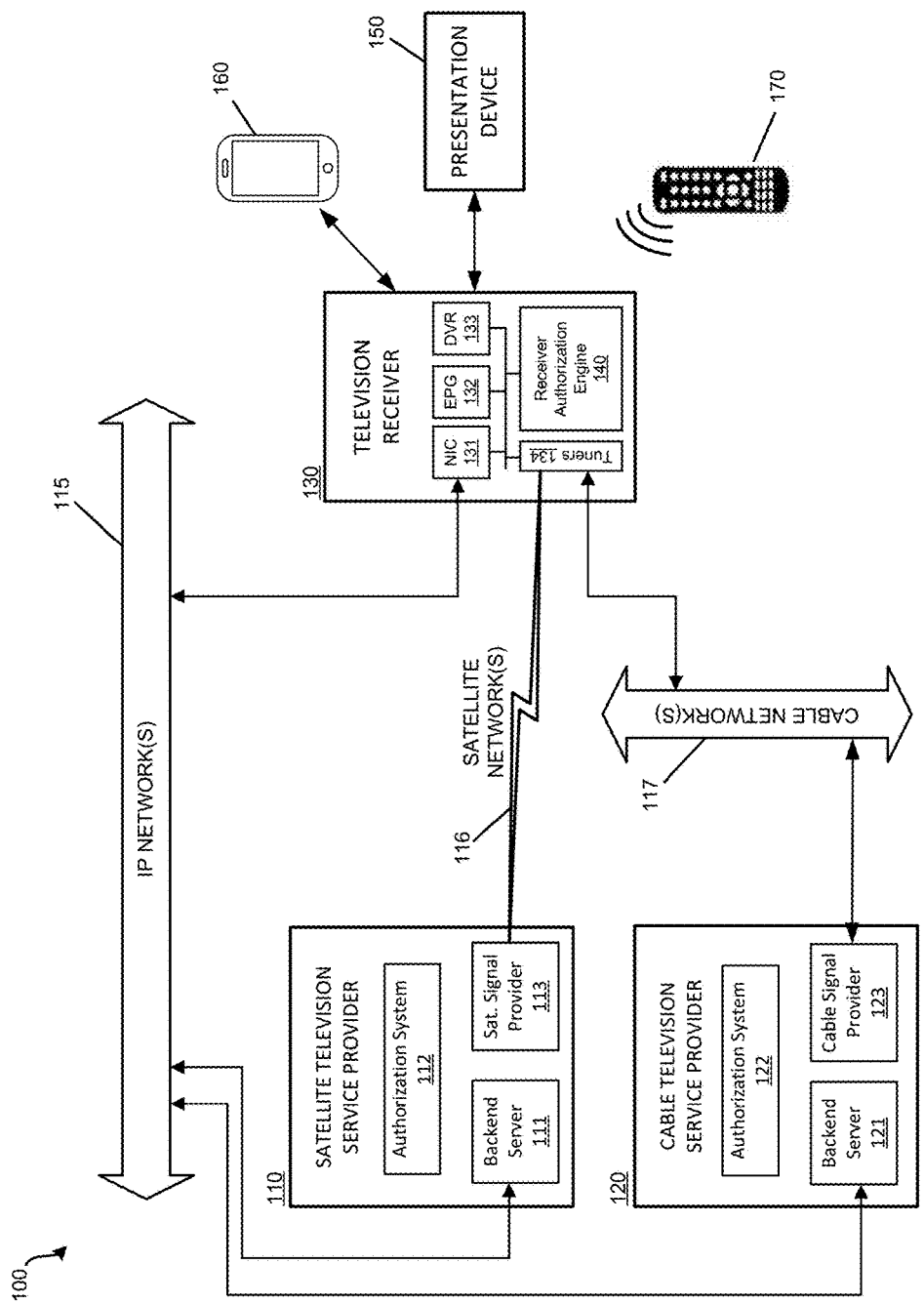
FIG. 1 is a block diagram illustrating an embodiment of a television receiver authorization system, according to one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for authorizing television receivers and other subscriber equipment via Internet Protocol (IP) networks. In various embodiments, television receiver devices (e.g., satellite television receivers, cable television receivers, etc.) may detect and establish connections to IP networks, for example, during a setup and configuration process of a newly installed receiver, or during a receiver rebuild, reinstallation, or software upgrade process. After connecting to one or more IP networks, the receiver may transmit identification data to a backend computer server of a television provider. The receiver identification data may include, for example, a receiver identifier and/or a separate smart card identifier associated with the subscriber. The backend server may use the receiver identification data to determine television subscription(s) associated with the receiver and/or customer, and may determine and transmit one or more authorization codes back to the receiver over the IP network. The receiver may use the authorization codes to program the device to decode and output the television channels and programs corresponding to the subscription. After the receiver is programed using the authorization codes, the receiver may receive television signals from a satellite and/or cable television provider over separate (e.g., non-IP) networks, and may descramble and output the channels and programs that the receiver is authorized to receive.

Additional aspects described herein relate to updating authorizations for television receiver devices via IP networks, based on subscription changes and/or television viewing data collected at the receiver. For example, user inputs may be received at the television receiver in order to change a subscription package of channels received from a satellite or cable television provider. The television receiver device may transmit the changed subscription package and identification data to a backend server of the television provider via an IP network. The backend server may determine and transmit updated authorization codes back to the receiver via the IP network. In other examples, the receiver may collect and analyze television viewing data (e.g., viewing patterns, viewing habits, favorite channels and programs, etc.), and may transmit the viewing data via the IP network to the backend server. Based on the viewing data, the television provider may determine and transmit back additional authorization codes via the IP network, allowing the receiver to receive additional channels or programs targeted specifically for the viewers at the receiver. These updated and/or additional authorization codes may be received by the receiver via the IP network, and used to further program the receiver device to decode and output the modified or additional set of television channels and programs received via cable, satellite, or other non-IP networks.

Thus, the various techniques described herein may allow television receiver authorization programming and configuration processes to be performed securely and efficiently over the IP network. Secure data transmission protocols and/or encryption may be to protect the authorization codes and other secure data transmitted over the IP network, and the limited transmission bandwidth of satellite networks 116 and cable networks 117 need not be used to transmit authorization codes and other receiver-specific data. In some embodiments, such authorization processes also may be performed automatically and not in response to any express user commands, for example, during receiver installation and setup processes, as well in response to user-initiated subscription changes and provider-initiated promotions or incentive programs.

The various embodiments described herein may be implemented on and within one or more different networks and systems, including satellite or terrestrial (e.g. cable) television distribution systems, telecommunications network systems, television distribution computer networks such as the Internet, cellular and other mobile networking systems, and the like. Therefore, although certain examples below are described in terms of specific types of user equipment (e.g., set-top boxes and other television receivers having digital video recorders, etc.) within specific systems (e.g., satellite television distribution systems), it should be understood that similar or identical embodiments may be implemented using other network systems and architectures (e.g., cable television networks, on-demand distribution networks, Internet television computer networks), as well as other user equipment and devices (e.g., personal computers, servers, routers, gaming consoles, smartphones, etc.).

Referring now to FIG. 1, an example television receiver authorization system 100 is shown on which various aspects of the present disclosure may be implemented. In this example, the television receiver authorization system 100 includes one or more television receivers 130 configured to receive television content from television service providers 110 and 120 over various different communication networks 115-117. As discussed below, in some embodiments, television receiver 130 may support various functionality to establish and connect to backend servers 111 and 121 operating at the television service providers 110 and 120 via an IP network 115. Television receiver 130 may transmit various types of data to the backend servers 111 and 121, such as orders/requests for television subscription packages, television viewing data, and receiver identification data. The television service providers 110 and 120 may use the data received from the receiver 130 via the IP network 115 to retrieve or generate authorizations codes, and then may transmit the authorizations codes back to the receiver 130 via the IP network 115. In some cases, the authorization codes may be secure and/or confidential, and the communication between receivers 130 and backend servers 111 and 121 via the IP network may use secure data transmission protocols and/or encryption to protect the authorization codes and other secure data. After the authorization codes are received via the IP network 115, the receiver 130 may use the authorizations codes to configure/program various components of the receiver device 130 to decode and output specific television channels or programs received from television service providers 110 and 120 via other (non-IP) networks, such as satellite networks 116 and cable networks 117.

In order to perform these features and the additional functionality described below, each of the components and sub-components shown in example system 100, such as television receiver 130, the servers and systems within the satellite and cable television service providers 110 and 120 (e.g., 111-113 and 121-123), presentation device 150, user computing device 160, etc., may correspond to a single computing device or server, or to a complex computing system including a combination of computing devices, storage devices, network components, etc. Each of these components and their respective subcomponents may be implemented in hardware, software, or a combination thereof. The components shown in system 100 may communicate via communication networks 115-117 (as well as other communication networks not shown in this figure), either directly or indirectly by way of various intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the television receiver 130, television service providers 110 and 120, and other components within television authorization system 100.

Television receivers 130 may be implemented using various specialized user equipment devices, such as cable system set-top boxes, satellite system set-top boxes, WiFi or Internet-based set-top boxes, gaming consoles, and the like. In other examples, television receivers 130 may be implemented using (or integrated into) other computing devices such as personal computers, network routers, tablet computers, mobile devices, etc. Thus, a television receiver 130 may be implemented as a single computing device or a computing system including a combination of multiple computing devices, storage devices, network components, etc. In some examples, a television receiver 130 may correspond to a primary television receiver (PTR) 210 including one or more network interface components (NICs) 131, an electronic programming guide (EPG) user interface component 132, a digital video recorder (DVR) 133, and a plurality of tuners 134 and related hardware/software components (e.g., audio/video decoders, descramblers, demultiplexers, etc.) as described below in more detail in FIGS. 2-3. In some cases, television receivers 130 may include one or more internal data stores and/or external data stores (e.g., external storage systems, database servers, file-based storage, cloud storage systems, etc.) configured to store television programs (e.g., audio/video files corresponding to television shows or movies, sporting events, live broadcasts, etc.), as well as image data and music/audio content that may be stored on television receivers 130 and output via presentation devices 150. In some embodiments, such data stores may reside in a back-end server farm, storage cluster, and/or storage-area network (SAN). As shown in this example, a receiver authorization engine 140 also may be implemented within the television receiver 130 to perform various functionality and communications relating to television receiver authorization and configuration processes, including transmitting receiver identification data, subscription packages selections, television viewing data, and the like, to backend servers 111 and 121, and receiving authorization codes and using the authorization codes to program/configure the receiver components to decode and output authorized television content, as described in more detail below.

As shown in this example, television receiver 130 may be configured to communicate with television service providers 110 and 120 over multiple communication networks 115-117. As shown in this example, receiver 130 may receive television content from multiple television providers simultaneously, including a satellite television service provider 110 and a cable television service provider 120. Although only two example television providers 110-120 are shown in FIG. 1, it should be understood that any number of different television providers may be used in other embodiments, including additional satellite and cable television service provider, on-demand television providers, pay-per-view (PPV) television providers, Internet-based television providers, television streaming services, etc. Additionally, although various components within the television receiver 130 and television service providers 110 and 120 are illustrated as standalone computer systems in this example, any or all of these components may be implemented within and/or integrated into one or more servers or devices of various content distribution systems and other computing architectures. For example, as discussed below in reference to FIGS. 2 and 3, the receiver authorization engine 140 may be implemented solely within a television receiver 130, or may be implemented within a combination of devices of a satellite television distribution system 200 or other television receiver authorization system 100. For example, the receiver authorization engine 140 may be implemented via one or more receiver authorization services 240 operating within servers 218 and/or television receivers 210 and 212 within a satellite television distribution system 200. In other embodiments, the receiver authorization engine 140 may be implemented similarly, as a standalone component and/or in a distributed manner, within other types of content distribution systems, such as terrestrial (e.g., cable) television distribution systems, telecommunications network systems, LAN or WAN computer networks (e.g., the Internet), cellular and other mobile networking systems, and any other computing environment configured to provide content. In any of these examples, the receiver authorization engine 140 may be implemented within (or integrated into) television receivers 130 as shown in FIG. 1, and/or within one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services.

Television content received and/or decoded by television receiver 130 may be presented via one or more presentation devices 150. Presentation devices 150 may correspond to televisions and other television viewing devices (e.g., home computers, tablet computers, smartphones, etc.). Additionally, various television receiver authorization systems 100 may incorporate other user equipment and devices, such as user devices 160 and remote control devices 170 configured to communicate with associated television receivers 130 and/or presentation devices 150. User devices 160 may include mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). In some embodiments, user devices 160 may be associated with specific television receivers 130 and/or specific customer accounts of television receiver authorization systems 100. As shown in FIG. 1, user devices 160 may be configured to receive data from and transmit data to an associated television receiver 130. Additionally or alternatively, user devices 160 may be configured to communicate directly with one or more television service providers 110 or 120, so that certain transmissions of television content and other functionality (e.g., generating and transmitting updated authorization codes, etc.) may potentially bypass the television receiver 130 in some embodiments.

Different presentations devices 150, user devices 160, and remote control devices 170 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different such devices 150-170 may support different input and output capabilities, and thus different types of user notifications and user inputs in response to notifications may be compatible or incompatible with certain devices 150-170. For example, certain notifications generated and output by a television receiver 130, or television service providers 110 and 120, may require specific types of processors, graphics components, and network components in order to be displayed (or displayed optimally) on a user device 160. Additionally, different types of user notifications may include different interactive user response features that require various specific input capabilities for presentation devices 150, user devices 160, and remote control devices 170, such as keyboards, mouses, touchscreens, voice control capabilities, gesture recognition, and the like. In some embodiments, the content of user notifications and/or the user response components may be customized based on the capabilities of the presentation device 150 and/or user device 160 selected to output the notification. Additionally, in some cases, users may establish user-specific preferences, which may be stored in the memory of the television receiver 130, for outputting specific types of user notifications to specific types of presentation devices 150 and/or user devices 160.

The television receivers 130, television service providers 110 and 120, presentation devices 150, and user devices 160 each may include the necessary hardware and software components to establish network interfaces and transmit/receive television signals or data streams, television receiver authorization codes related data, user interfaces and notifications, etc. Some or all of these devices may include security features and/or specialized hardware (e.g., hardware-accelerated SSL and HTTPS, WS-Security, firewalls, etc.) in order to present the various confidential data transmitted between components (e.g., receiver identification data, viewing data, authorization codes, etc.), and to prevent hacking and other malicious access attempts within the system 100. In some cases, the television receivers 130 may communicate with television service providers 110 and 120, and/or user devices 160, using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 100 may use, for example, the Secure Sockets Layer (SSL) or Transport Layer Security (TLS) protocol to provide secure connections between the television receivers 130, providers 110 and 120, and user devices 160. SSL or TLS may use HTTP or HTTPS to provide authentication and confidentiality.

As shown in this example, television receivers 130 and television service providers 110 and 120 (and/or user devices 160) may communicate over various different types of networks 115. For example, network 115 is an Internet Protocol (IP) network, which may use the Internet networking model and/or communication protocols. IP network 115, through which television receivers 130 and television service providers 110 and 120 communicate, may include local area networks (LANs), wide area networks (WANs) (e.g., the Internet), and/or various wireless telecommunications networks. For example, when a receiver authorization engine 140 is implemented within a television receiver 130, wireless router, modem, or other local user equipment, then IP network 115 may include wireless local area networks (WLANs) or other short-range wireless technologies such as Bluetooth®, mobile radio-frequency identification (M-RFID), and/or other such communication protocols. In other examples, when at least a portion or component of a receiver authorization service 240 is implemented remotely at a backend server 111 or 121, or other computer server, satellite hub, cable headend, etc., then IP network 115 may include one or more WANs (e.g., the Internet), various cellular and/or telecommunication networks (e.g., 3G, 4G or EDGE (enhanced data rates for global evolution), WiFi (IEEE 802.11 family standards, or other mobile communication technologies), or any combination thereof. Additionally, system 100 includes satellite networks 116 and cable data networks 117, which may be used in this example for respectively transmitting satellite television data signals and cable television data signals to television receivers 130 and other user equipment. However, it should be understood that IP network 115 also may include various components of satellite communication networks and/or or terrestrial cable networks in some embodiments. For communication between presentation device 150, user devices 160, remote controls 170, and their associated television receivers 130, then communications may include use of a WLAN and/or other short-range wireless technologies. However, for communication between television receivers 130 and remotely located mobile user devices 160 (and/or for user devices 160 that are configured to communicate directly with television service providers 110 and 120), then communications may include WANs, satellite networks, terrestrial cable networks, and/or cellular or other mobile telecommunication networks, etc.

As discussed above, various components of the television receiver authorization system 100 may be implemented as standalone hardware and software systems, and may be implemented within one or more different computer network systems and architectures. For example, in reference to FIGS. 2 and 3, the receiver authorization system 100 may be implemented using one or more receiver authorization services 240 executing within server hardware 218 and/or television receiver devices 210 within a satellite television distribution system 200. However, in other embodiments, the components of a television receiver authorization system 100 may be incorporated within various different types of content distribution systems. For example, corresponding embodiments to those described in FIGS. 2 and 3 may be implemented within terrestrial cable television distribution systems, telecommunications network systems, LAN or WAN computer networks (e.g., the Internet), cellular and other mobile networking systems, and the like. In any of these examples, a television receiver authorization system 100 may be implemented within (or integrated into) one or more content servers (e.g., satellite hubs, cable head ends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services. Thus, although not so limited, an appreciation of various aspects of the present disclosure may be gained from the following discussion in connection with FIGS. 2 and 3.

Figure 2:
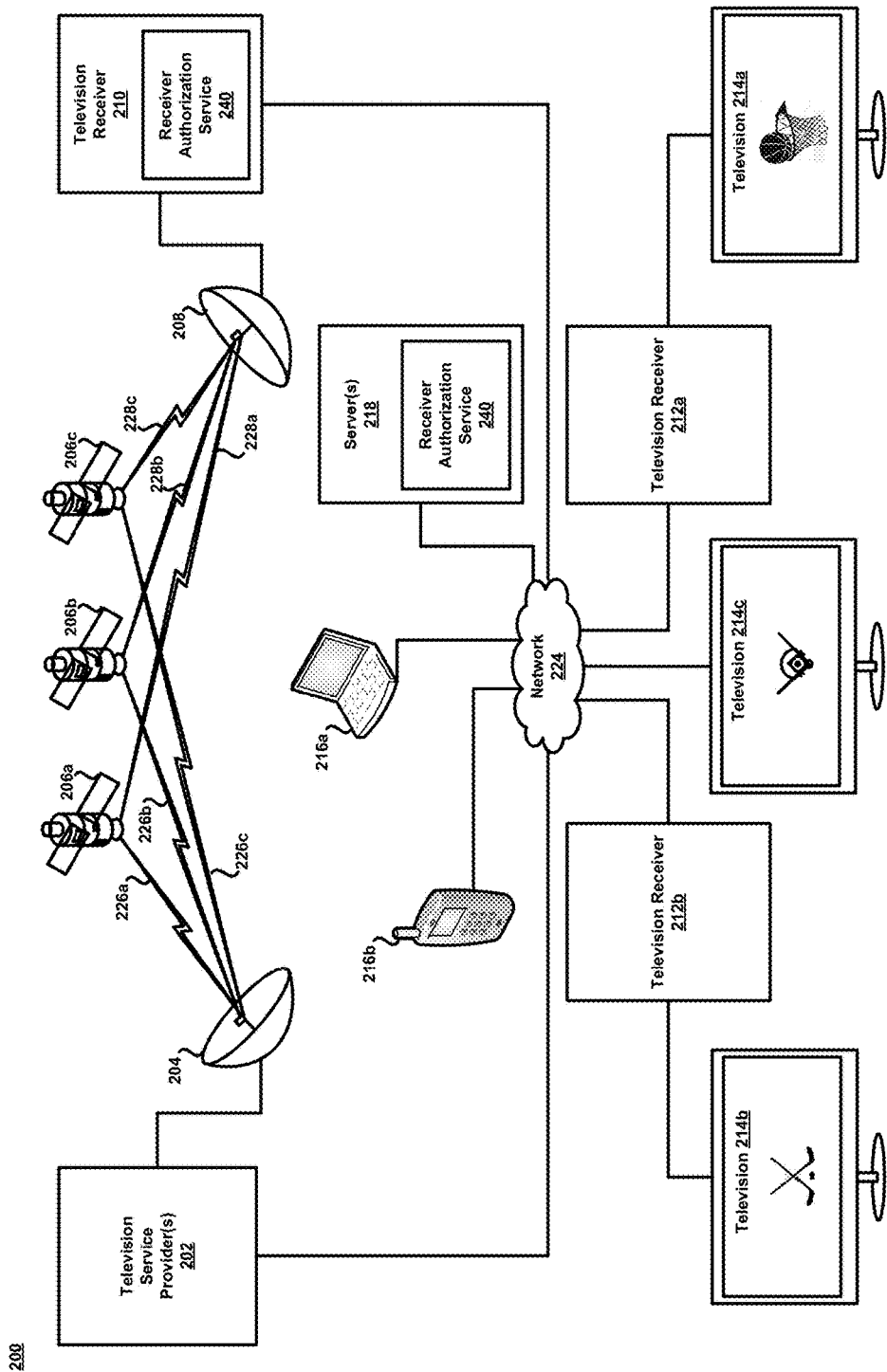
FIG. 2 is a block diagram illustrating an example satellite television system, according to one or more embodiments of the disclosure.

Referring now to FIG. 2, an example satellite television distribution system 200 is shown in accordance with the principles of the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include one or more service providers 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*, and at least one server 218 that may in general be associated with or operated by or implemented by the service providers 202. Additionally, the PTR 210 and/or the server 218 may include or otherwise exhibit an instance of receiver authorization service module 240. The receiver authorization module 240 may be implemented and configured using various hardware and software components discussed above, in order to support the features and perform the functionality of the various television receiver authorization systems 100 discussed above in reference to FIG. 1. Thus, receiver authorization service modules 240 in this embodiment may be configured to, for example, transmit receiver identification data, subscription packages selections, television viewing data, and the like, to backend servers 111 and 121, receive authorization codes, and use the authorization codes to program/configure the receiver components to decode and output authorized television content, as described in more detail below.

The system 200 may further include at least one network 224 that establishes a bi-directional communication path for data transfer between and among each respective element of the system 200, outside or separate from the unidirectional satellite signaling path. The network 224 may correspond to the IP network 115 discussed above in reference to FIG. 1, and/or may represent any number of terrestrial and/or nonterrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among elements of the system 200.

The PTR 210, and the STRs 212*a-b*, as described throughout may generally be any type of television receiver, television converter, etc., such as a set-top box (STB) for example. In another example, the PTR 210, and the STRs 212*a-b*, may exhibit functionality integrated as part of or into a television, a DVR (Digital Video Recorder), a computer such as a tablet computing device, or any other computing system or device, as well as variations thereof.

Further, the PTR 210 and the network 224, together with the STRs 212*a-b* and televisions 214*a-c*, and possibly the computing devices 216*a-b*, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206*a-c* may each be configured to receive uplink signals 226*a-c* from the satellite uplink 204. In this example, each the uplink signals 226*a-c* may contain one or more transponder streams of particular data or content, such as one or more particular television channels, as supplied by the service provider 202. For example, each of the respective uplink signals 226*a-c* may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206*a-c*.

Further, different media content may be carried using different transponders of a particular satellite (e.g., satellite 206*a*); thus, such media content may be transmitted at different frequencies and/or different frequency ranges. For example, a first and second television channel may be carried on a first carrier frequency over a first transponder of satellite 206*a*, and a third, fourth, and fifth television channel may be carried on second carrier frequency over a first transponder of satellite 206*b*, or, the third, fourth, and fifth television channel may be carried on a second carrier frequency over a second transponder of satellite 206*a*, and etc. Each of these television channels may be scrambled such that unauthorized persons are prevented from accessing the television channels.

The satellites 206*a-c* may further be configured to relay the uplink signals 226*a-c* to the satellite dish 208 as downlink signals 228*a-c*. Similar to the uplink signals 226*a-c*, each of the downlink signals 228*a-c* may contain one or more transponder streams of particular data or content, such as various encoded and/or at least partially electronically scrambled television channels, on-demand programming, etc., in accordance with an allotted carrier frequency and bandwidth. The downlink signals 228*a-c*, however, may not necessarily contain the same or similar content as a corresponding one of the uplink signals 226*a-c*. For example, the uplink signal 226*a* may include a first transponder stream containing at least a first group or grouping of television channels, and the downlink signal 228*a* may include a second transponder stream containing at least a second, different group or grouping of television channels. In other examples, the first and second group of television channels may have one or more television channels in common. In sum, there may be varying degrees of correlation between the uplink signals 226*a-c* and the downlink signals 228*a-c*, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal, plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
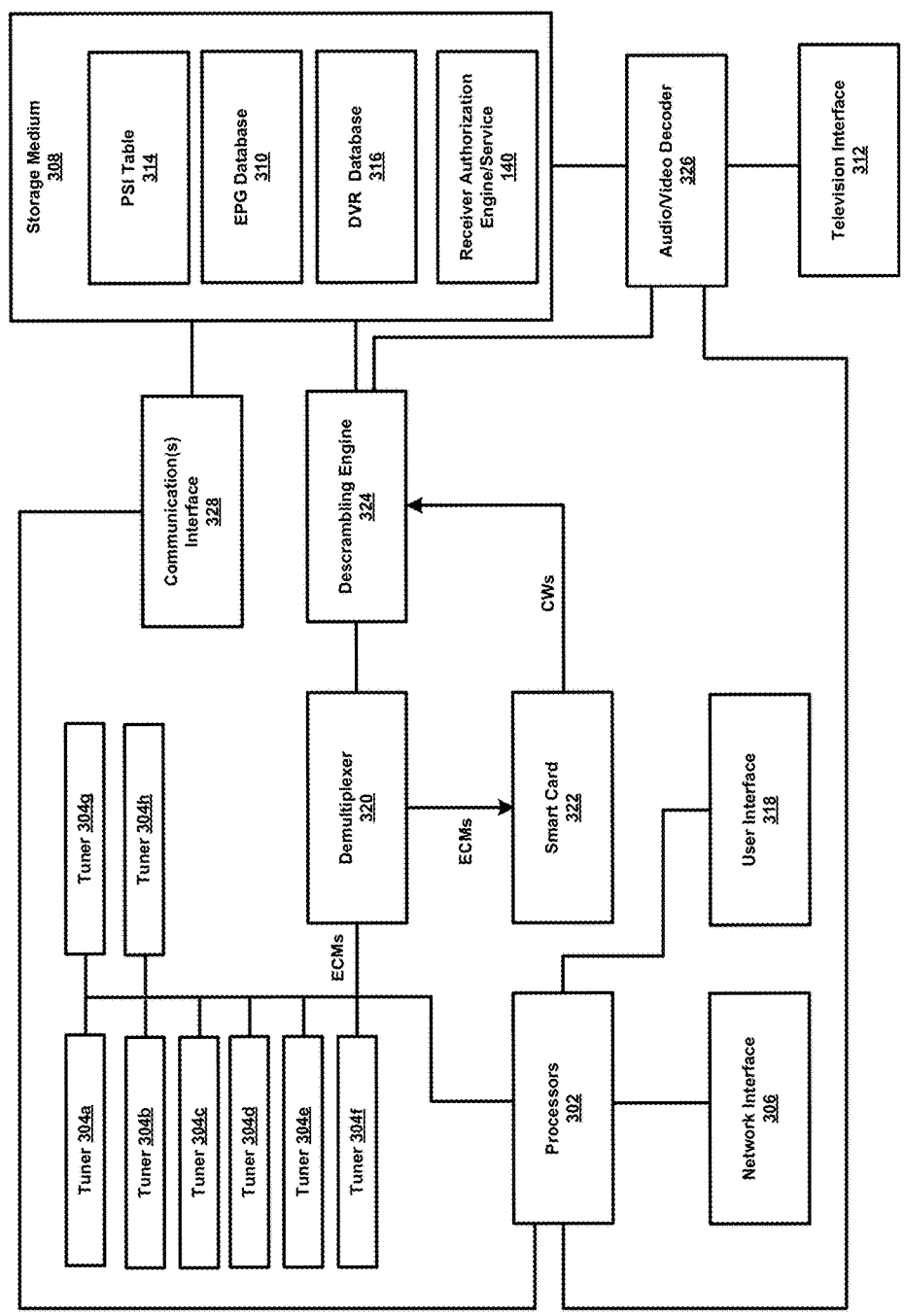
FIG. 3 is a block diagram illustrating an example television receiver device, according to one or more embodiments of the disclosure.

Referring now to FIG. 3, an example block diagram of the PTR 210 of FIG. 2 is shown in accordance with the disclosure. In some examples, the STRs 212a-b may be configured in a manner similar to that of the PTR 210. In some examples, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between a service provider 202 of FIG. 2 and the PTR 210 may be via satellites 206a-c, which may be unidirectional to the PTR 210, and another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the receiver authorization engine 140 discussed above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308 or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4       | 1         | 2           | 27      | 2001       | 1011      |
| 5       | 2         | 11          | 29      | 2002       | 1012      |
| 7       | 2         | 3           | 31      | 2003       | 1013      |
| 13      | 2         | 4           | 33      | 2003, 2004 | 1013      |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. The control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing systems and devices as shown in FIG. 2 and FIG. 3, discussed further below. It is contemplated that the communication interface 328 may take or exhibit any form as desired, and may be configured in a manner so as to be compatible with a like component or element incorporated within or to a particular one of the computing systems and devices as shown in FIG. 2 and FIG. 3, and further may be defined such that the communication link may be wired and/or or wireless. Example technologies consistent with the principles or aspects of the present disclosure may include, but are not limited to, Bluetooth®, WiFi, NFC (Near Field Communication), HomePlug®, and/or any other communication device or subsystem similar to that discussed below in connection with FIG. 10.

For brevity, the PTR 210 is depicted in a simplified form, and may generally include more or fewer elements or components as desired, including those configured and/or arranged for transmitting receiver identification data, subscription packages selections, television viewing data, and the like, to television provider servers, receiving authorization codes, and using the authorization codes to program/configure the components of the PTR 210 to decode and output authorized television content, in accordance with the principles of the present disclosure. For example, the PTR 210 is shown in FIG. 3 to include an instance of the receiver authorization engine 140 as mentioned above in connection with FIG. 1. In other examples, the PTR 210 may include a receiver authorization service 240, as shown above in FIG. 2, that is configured to communicate with a corresponding service 240 in a server 218. While shown stored to the storage medium 308 as executable instructions, a receiver authorization engine 140 (and/or service 240) could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
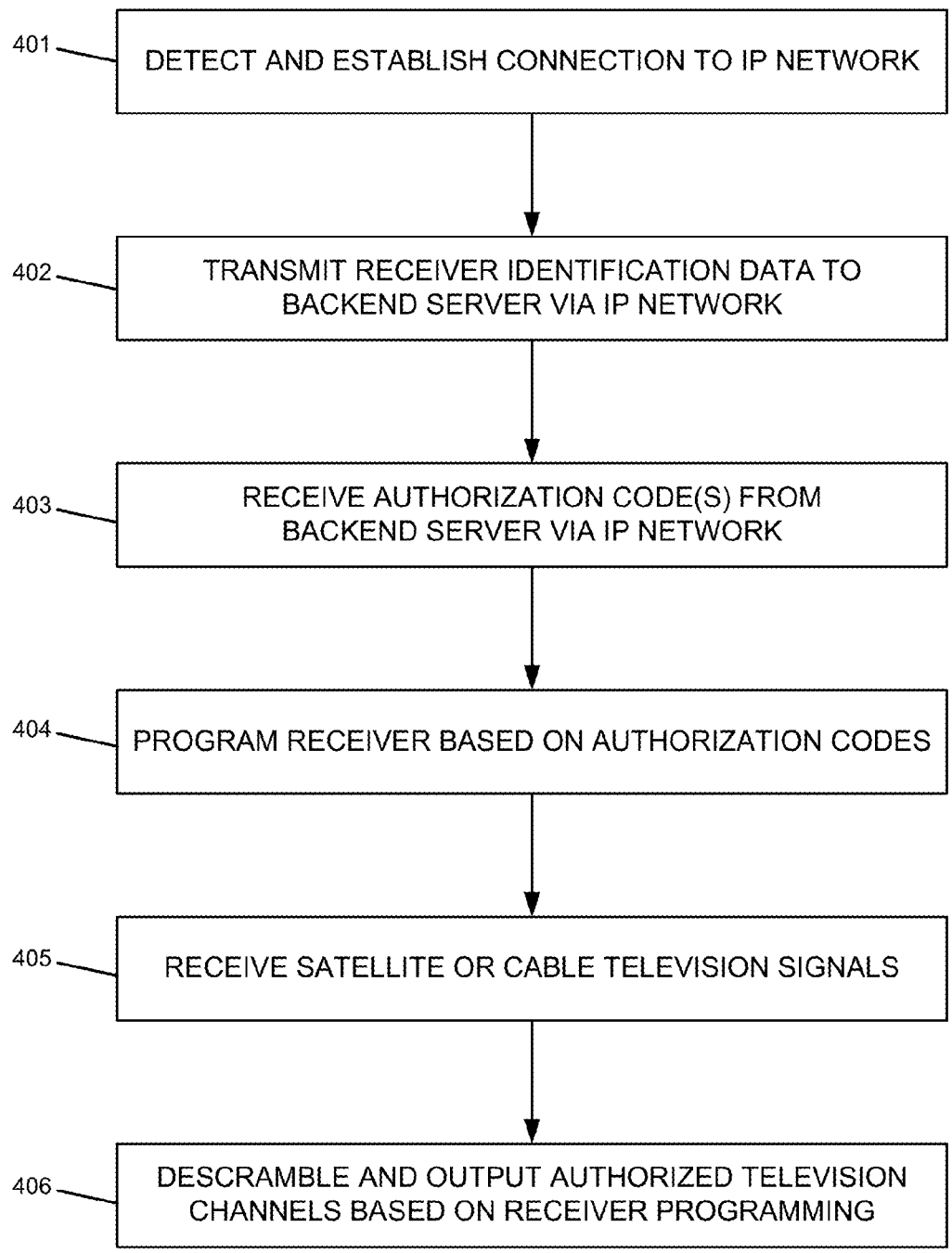
FIG. 4 is a flow diagram illustrating an example process of authorizing a satellite or cable television receiver via an Internet Protocol network, according to one or more embodiments of the disclosure.

Referring now to FIG. 4, a flow diagram is illustrating a process of authorizing a television receiver via an Internet Protocol (IP) network. As described below, the steps in this process may be performed by one or more components in the television receiver authorization system 100 and other related systems and components described above. For example, in some cases, steps 401-406 may correspond to the functionality performed by a cable or satellite television receiver 130 (e.g., primary receiver 210), operating autonomously or in communication with user devices 160, backend servers 111 and 121, etc. In other cases, different combinations of devices may be used to perform the steps described below. Additionally, it should be understood that the techniques described herein for authorizing television receivers via IP networks need not be limited to the specific systems and hardware implementations described above in FIGS. 1-3, but may be performed within other computing environments comprising other combinations of hardware and software components.

In step 401, the television receiver 130 (e.g., a satellite and/or cable television receiver) may detect and establish a connection to an IP network. In some cases, step 401 may be performed as part of a set-up and installation process on a new receiver 130. For example, after a user receives and connects a new television receiver 130 within the user's home or other location, the television receiver 130 may automatically initiate one or more setup processes during which the television receiver 130 is installed and configured for operation at the user's location. In other examples, step 401 may be performed during a rebuild, reinstallation, or data recovery process for a receiver already installed at the user's location. Such processes may be initiated automatically by the receiver, for example, in response to an error, device failure, or software upgrade.

During step 401, the receiver 130 may be configured to automatically detect physical network connections attached to the receiver 130 and/or the presence of one or more available wireless networks (e.g., WLAN) or other short-range wireless connection options such as Bluetooth®, mobile radio-frequency identification (M-RFID), and/or other such communication techniques. In such cases, the receiver 130 may determine that a detected network is secure, and may output a user interface to a presentation device 150 and/or user device 160 to prompt the user to input a network password or other network authentication credentials. After connecting to one or more IP networks locally, the receiver 130 may confirm that the local network(s) are connected to the Internet and/or other wide area networks, for example, by pinging backend servers 111 and 121 to confirm the existence of an available communication channel.

In step 402, the television receiver 130 may collect and transmit receiver identification data to one or more backend servers 111 and 121. As with step 401, the functionality of step 402 may be performed as part of a new receiver setup process and/or a rebuild/reinstallation process for an existing receiver 130 installed at the user's location. The transmission in step 402 may correspond to a confirmation message that the receiver 130 is online and/or a request for new/updated authorization codes from the television service providers 110 and 120.

In some embodiments, the receiver identification data transmitted in step 402 may include one or more unique identifiers associated with the receiver device itself (e.g., a receiver serial number, receiver name, etc.) and/or one or more unique identifiers associated with various receiver components (e.g., an identifier associated with the receiver smart card 322). Additionally, in some cases, the receiver identification data transmitted in step 322 may include one or more pieces of data associated with the television service customer and/or account, for example, a customer name, account number, physical address, geographic region, etc. Further, the receiver identification data may include data describing the networks and network environment at which the receiver 130 is installed, such as IP address, MAC address, subnetwork identification, router or firewall identifier, network name and credentials, etc.

As noted above, in some embodiments, the transmission of the receiver identification in step 402 may be performed over an IP network 115, rather than the separate satellite network 116 and/or cable network 117 over which the television data signals are received. Thus, any upstream transmission limitations, network congestion and/or connectivity issues affecting the satellite and cable networks, need not affect the transmission of the receiver identification data in step 402 (or the reception of authorization codes in step 403). Additionally, in some embodiments, the receiver 130 may be configured to encrypt the receiver identification data and/or to use various secure network communication techniques and protocols for transmitting the receiver identification data to the backend servers 111 and 121. Such techniques may include, for example, security features and/or specialized hardware (e.g., hardware-accelerated SSL and HTTPS, WS-Security, firewalls, etc.), use of secure data transmission protocols and/or encryption, such as FTP, SFTP, and/or PGP encryption. SSL or TLS protocols, along with HTTP or HTTPS, also may be used to provide secure connections between the television receiver 130 and backend servers 111 and 121, to provide authentication and confidentiality.

In step 403, one or more authorization codes may be received from the backend servers 111 and/or 121. The process by which television service providers 110 and/or 120 generate and/or retrieve authorization codes is described below in reference to FIG. 5. As noted above, authorization codes may correspond to particular television channels and/or programs, as well as combinations of channels and programs (e.g., subscription channel packages). Thus, the authorization codes received by the receiver 130 in step 403 may correspond to the channels/programs that the receiver 130 is entitled to receive and output, based on the customer's channel subscription package, PPV or VOD orders, etc. In some embodiments, the authorization codes received in step 403 may correspond to Entitlement Control Messages (ECMs), such as those described above in reference to FIG. 3; however, other types of authorization codes may be used in other embodiments. Additionally, the authorization codes may be transmitted in step 403 over IP network 115, and may optionally use some or all of the same encryption and secure network communication techniques described above in reference to step 402.

In step 404, the television receiver 130 may use the authorization codes received in step 403 to program itself to receive, decode, and output specific television channels and/or programs from television service providers 110 and/or 120. For example, in some embodiments, the receiver 130 may configure or program an internal smart card 322 and/or various other receiver components (e.g., demultiplexer 320, descrambling engine 324, audio/video decoder 326, etc.), using the authorization codes received in step 403. Examples of the use of authorization codes (e.g., ECMs) to enable a receiver 130 to demultiplex, descramble, decode, and output television signals (for authorized channels/programs only) are described above in reference to FIG. 3, although it should be understood that other techniques for programming/configuring receivers 130 may be used in other examples. Additionally, in some cases, the authorization codes may be receiver-specific, so that a set of authorization codes used to program a particular receiver 130 could not be used to successfully program a different receiver 130. In other cases, authorization codes may be associated with specific television channels or content, and the same codes may be used to program multiple different receivers 130.

In step 405, after the receiver 130 has been programmed/configured using the authorization codes in step 404, the receiver 130 may receive satellite and/or cable television signals respectively via networks 116 and/or 117. In step 406, the receiver 130 may descramble and output those television signals for which the receiver 130 is authorized to receive, to one or more presentation devices 150. As noted above, prior to receiving the authorization codes and programming the receiver 130 in steps 403-404, the various components of receiver 130 (e.g., the smart card 322 demultiplexer 320, descrambling engine 324, decoder 326, etc.) may be configured not to allow the successful reception, demultiplexing, descrambling, decoding, and/or outputting of certain television signals. However, after the receiver 130 has been programmed using valid authorization codes in step 404, the receiver may successfully receive, demultiplex, descramble, decode, and output the television signals received via satellite and cable networks 116 and/or 117, in accordance with the received authorization codes.

Figure 5:
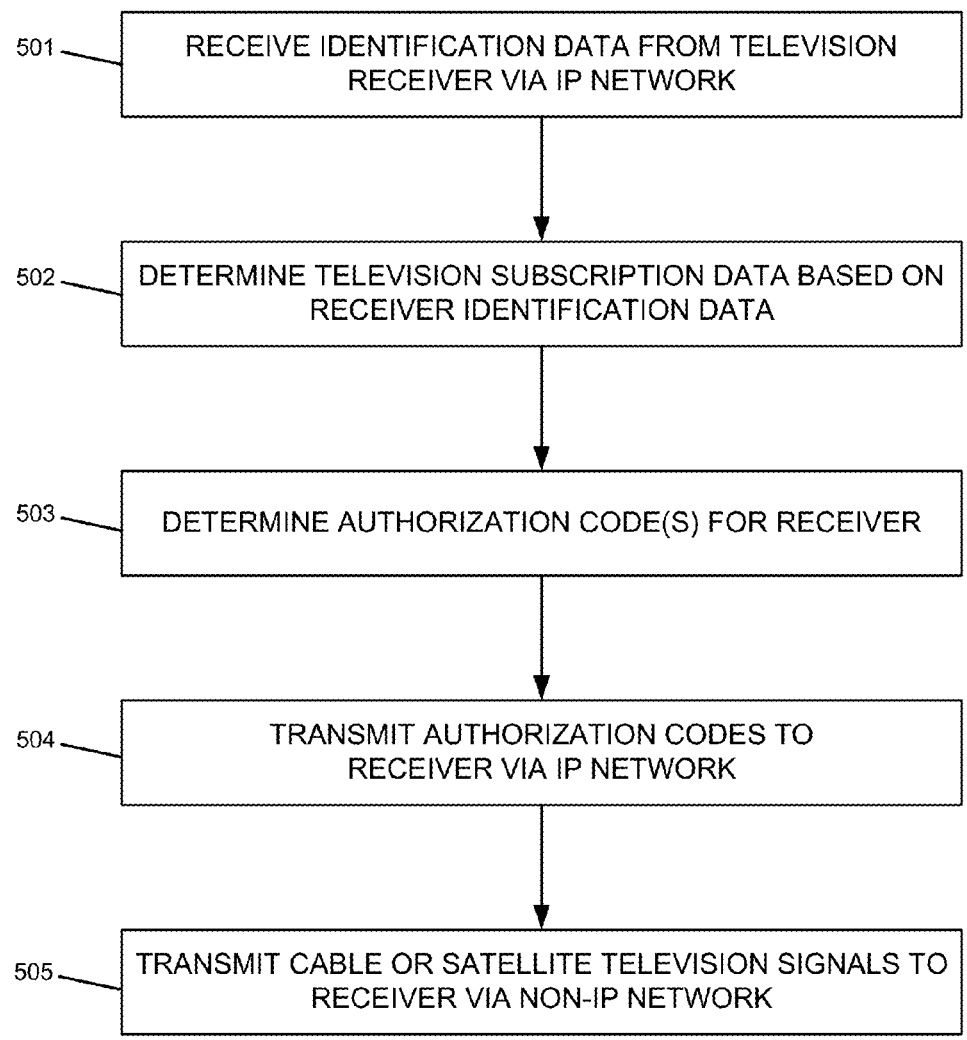
FIG. 5 is a flow diagram illustrating an example process of determining and transmitting authorization codes to a satellite or cable television receiver via an Internet Protocol network, according to one or more embodiments of the disclosure.

Referring now to FIG. 5, another flow diagram is illustrating a process of determining and transmitting authorization codes to a television receiver 130 via an Internet Protocol network 115. The steps in this process may be performed by one or more computer servers, such as backend servers 111 and 121, associated with television providers 110 and 120. As noted above, the determination and transmission of authorization codes may be performed in response to a request and/or other data received from a receiver 130 (step 402) via the IP network 115, for example, during a receiver installation, setup, and/or configuration process. Additionally, it should be understood that the techniques described herein for determining and transmitting authorization codes to television receivers via IP networks need not be limited to the specific systems and hardware implementations described above in FIGS. 1-3, but may be performed within other computing environments comprising other combinations of hardware and software components. For example, such processes may be implemented not only using backend servers 111 and 121 integrated into television service providers 110 and 120, but also using backend server(s) that are located remotely and operate independently from the television service providers 110 and/or 120. For instance, backend servers 111 and 121 and/or authorization systems 112 and 122 may be provided by an independent authorization code provider configured to generate and provide receiver authorization codes for one or more separate television service providers.

In step 501, a computer server on an IP network 115 (e.g., backend server 111) may receive a transmission of identification data associated with a receiver 130 via the IP network. The identification data received in step 501 may correspond to the data transmitted by the receiver 130 in step 402. Thus, as discussed above in reference to step 402, the data received by the backend server 111 may correspond to a confirmation message and/or authorization code request from a television receiver 130 that has recently come online during a receiver setup process. The receiver identification data may include, for example, a receiver 130 identifier, a smart card 322 identifier, and/or any of the other various types of receiver/customer identification data described above. Additionally, as discussed above, the receiver identification data may be transmitted over the IP network 115 as encrypted data and/or using secure network communication techniques and protocols. Thus, backend server 111 and/or 121 may be configured to implement secure network communication techniques and decryption to receive the data in step 501.

In step 502, the backend server (e.g., 111 or 121) may use the receiver identification data to determine television subscription data (and/or other television content access data) associated with the receiver 130. For example, a backend server 111 (or 121) may use a receiver number and smart card number (and/or any other identification data received in step 501), to look up the associated customer account information from an authorization system 112 (or 122). The customer account information may include a television channel subscription package and/or other televisions channels/programs that the customer is authorized to receive from the television service provider 110 (or 120). The customer account information also may include, for example, receiver numbers, smart card numbers, other equipment identifiers, network address data and/or geographic region data associated with the customer account. Thus, in some embodiments, the backend server may confirm the authenticity of the request in step 501 by verifying the receiver/customer identification data received in step 501 against the receiver/customer data stores of the television service provider 110 or 120.

In step 503, the backend server (e.g., 111 or 121) may determine one or more authorization codes to be transmitted to the receiver 130, based on the television subscription/authorization data retrieved in step 502. In some embodiments, step 503 may include retrieving the appropriate authorization code(s) from an authorization code data store at the television service provider 110 or 120. For example, the correct authorization code(s) to transmit to a receiver 130 may depend on the television subscription/authorization data associated with the receiver 130, as well as various other factors, such as the specific receiver device type, receiver components/features, the geographic region at which the receiver 130 is installed, the type of communication network(s) and network hardware to which the receiver 130 is connected, the number of receivers at the customer's location, etc. Additionally, in some cases, the appropriate authorization code(s) may be generated on-the-fly in step 503, in response to the data received in step 501, based on the subscription data and/or any combination of the above factors. For example, authorization codes may be encrypted using encryption key data based on the receiver identification data (e.g., receiver number, smart card number, network identifier, geographic region identifier, etc.) so that an authorization code intended for a particular receiver device 130 cannot be intercepted and used by a different receiver device 130 at a different location and/or on a different network.

Additionally, it is because of these various factors that television receivers 130 cannot simply be preprogrammed with authorization codes before they are shipped to customer locations. Customers also may change their television channel subscriptions after installing their receivers 130, and in some cases television service providers may authorize/de-authorize their customers from accessing certain additional channels/programs during different time periods. Therefore, the process of retrieving and/or generating authorization codes in step 503 may be receiver-specific and customer-specific, and may depend on the installation location of the receiver 130, the receiver's network connections and associated hardware, the request time, and other factors.

In step 504, the backend server (e.g., 111 or 121) may transmit the authorization codes retrieved or generated in step 503, back to the receiver 130 via the IP network 115. As discussed above in reference to step 403, the authorization codes may correspond to Entitlement Control Messages (ECMs), such as those described above in reference to FIG. 3; however, other types of authorization codes may be used in other embodiments. Additionally, the authorization codes may be transmitted over IP network 115, using some or all of the encryption and secure network communication techniques and protocols described above.

In step 505, television service providers 110 and/or 120 may transmit satellite and/or cable television signals to the receiver 130 using satellite and cable networks 116 and 117, respectively. As noted above, the transmission of television content from service providers 110 and/or 120 may be performed by signal providers 113 and 123, which operate separately from backend server 111 and 121, using separate (non-IP) transmission networks 116 and 117. In some embodiments, transmission networks 116 and 117 may be configured solely or primarily for broadcasting transmissions to many television receivers 130, and these networks may have limited or no capabilities for transmitting upstream data back from the receivers 130 to television data sources 110 and 120. For example, as discussed above, satellite television provider system 110 may transmit content via an antenna over a unidirectional satellite communication path 117 to a satellite dish and satellite television receiver 130, while cable television providers 120 may use a specialized wired network infrastructure 117 for delivering television content to receivers 130.

As discussed above, the television content transmitted by television providers 110 and 120 in step 505 may be encrypted, scrambled, or otherwise encoded to prevent access by unauthorized devices. Thus, television receivers 130 may only access the content transmitted in step 505 after receiving and programming itself based on the authorization codes transmitted via the IP network 115 in step 504, as described above in reference to FIG. 4.

Figure 6:
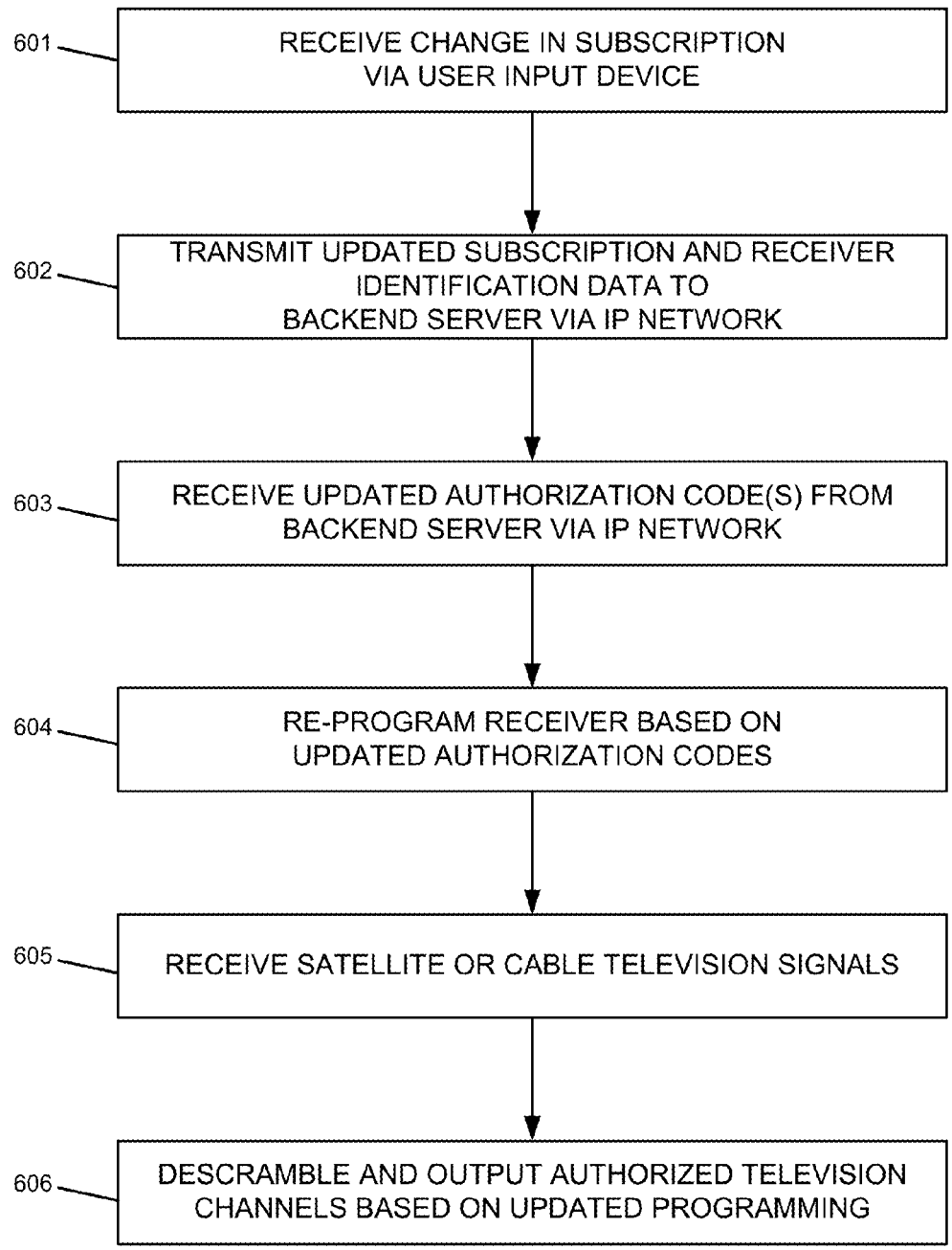
FIG. 6 is a flow diagram illustrating an example process of updating a television receiver authorization via an Internet Protocol network, based on a subscription change, according to one or more embodiments of the disclosure.

Referring now to FIG. 6, a flow diagram is shown illustrating a process of updating the authorization of a television receiver 130 via an Internet Protocol network 115. Specifically, this process describes updating the authorization codes at a receiver based on a change in a subscription channel package by a customer. As with FIG. 4, discussed above, the steps in this process may be performed by a cable or satellite television receiver 130 (e.g., primary receiver 210), operating autonomously or in communication with user devices 160, backend servers 111 and 121, etc. In other embodiments, different combinations of devices may be used to perform the steps described below. Additionally, it should be understood that the techniques described herein for updating the authorization data at television receiver 130 via IP network 115 need not be limited to the specific systems and hardware implementations described above in FIGS. 1-3, but may be performed within other computing environments comprising other combinations of hardware and software components.

Figure 7:
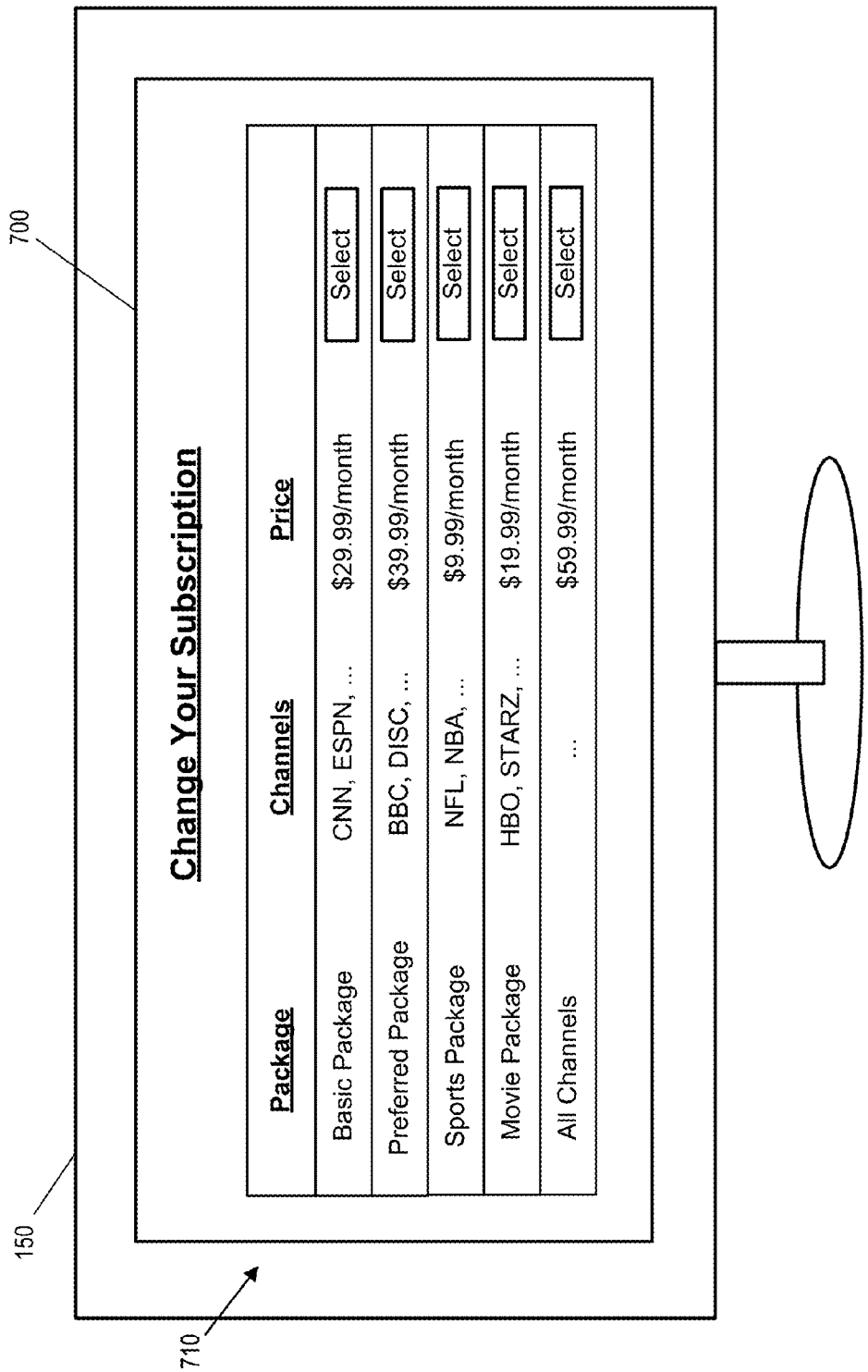
FIG. 7 shows an illustrative user interface screen displayed on a presentation device for initiating a subscription change, according to one or more embodiments of the disclosure.

In step 601, the receiver 130 may receive data indicating a requested change to the receiver's 130 television channel subscription package. In some embodiments, change requests (or commands) may be received at the receiver 130 via a user input device such as remote control 170. For example, referring briefly to FIG. 7, an example user interface screen 700 is displayed on a presentation device 150. In this example, user interface screen 700 includes a list available subscription packages 710 from which the customer may select directly via the customer's receiver 130. The selection of a subscription package from the list 710 may correspond to the change request received in step 601. Thus, in this example, customers may change subscription packages directly via their receiver 130, without needing to contact a television provider by phone, website, etc. In other examples, requests from customers to change television channel subscriptions may be received by user devices 160, rather than by receivers 130. For example, a customer may use a mobile application or access web-based interface via a mobile device 160 or personal computer 160, to select an updated subscription package.

In step 602, data identifying the updated subscription package selected in step 601, along with receiver identification data, may be transmitted to a backend server 111 or 121 via IP network 115. The receiver identification data transmitted in step 602 may be similar or identical to the receiver identification data transmitted in step 402, discussed above. Step 602 may include some or all of the functionality discussed above in steps 401 and 402, including detecting and establishing a connection to the IP network, and retrieving and transmitting the receiver identification data. The data transmitted in step 602 may correspond to a subscription change request and/or authorization code request, and may include the receiver identification data and/or the updated subscription data. The data may be transmitted by the receiver 130, or by a user device 160, and may be transmitted over the IP network 115 as encrypted data and/or using secure network communication techniques and protocols, as discussed above.

In step 603, the receiver 130 may receive one or more updated authorization codes from the backend servers 111 and/or 121 via the IP network 115, and in step 604 the receiver 130 may use the updated authorization codes to program (or re-program) various components of receiver. In some embodiments, receiving and programming updated authorization codes by the receiver 130 may be similar or identical to the processes of receiving and programming an initial set of authorization codes. Accordingly, performing steps 603 and 604 by the receiver 130 may be similar or identical to performing steps 403 and 404, discussed above. For example, updated authorization codes (e.g., ECMs), corresponding to sets of television channels and/or programs may be received in step 603 over IP network 115, optionally using some or all of the same encryption and secure network communication techniques described above. In step 604, the receiver 130 may use the updated authorization codes to program smart card 322 and/or various other receiver components, such as the demultiplexer 320, descrambling engine 324, audio/video decoder 326, etc.

In step 605, after the receiver 130 has been programmed/configured using the updated authorization codes in step 604, the receiver 130 may receive satellite and/or cable television signals respectively via networks 116 and/or 117. In step 606, the receiver 130 may descramble and output those television signals for which the receiver 130 is authorized to receive, to one or more presentation devices 150. Thus, in some embodiments, receiving, demultiplexing, descrambling, decoding, and outputting authorized program content by the receiver 130 may be similar or identical to the processes described in steps 405 and 406, discussed above.

Figure 8:
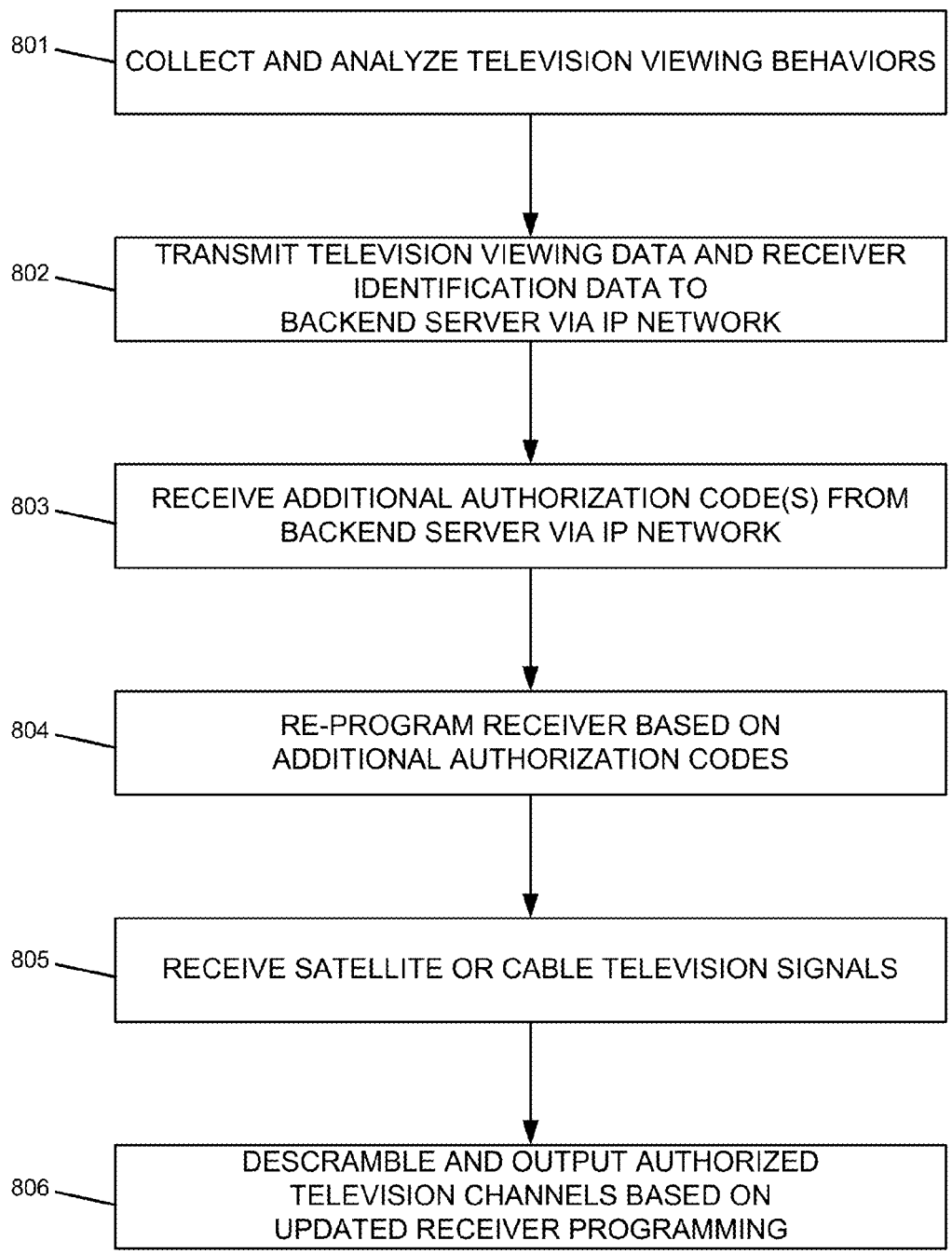
FIG. 8 is a flow diagram illustrating an example process of updating a television receiver authorization via an Internet Protocol network, based on television viewing data, according to one or more embodiments of the disclosure.
Figure 9:
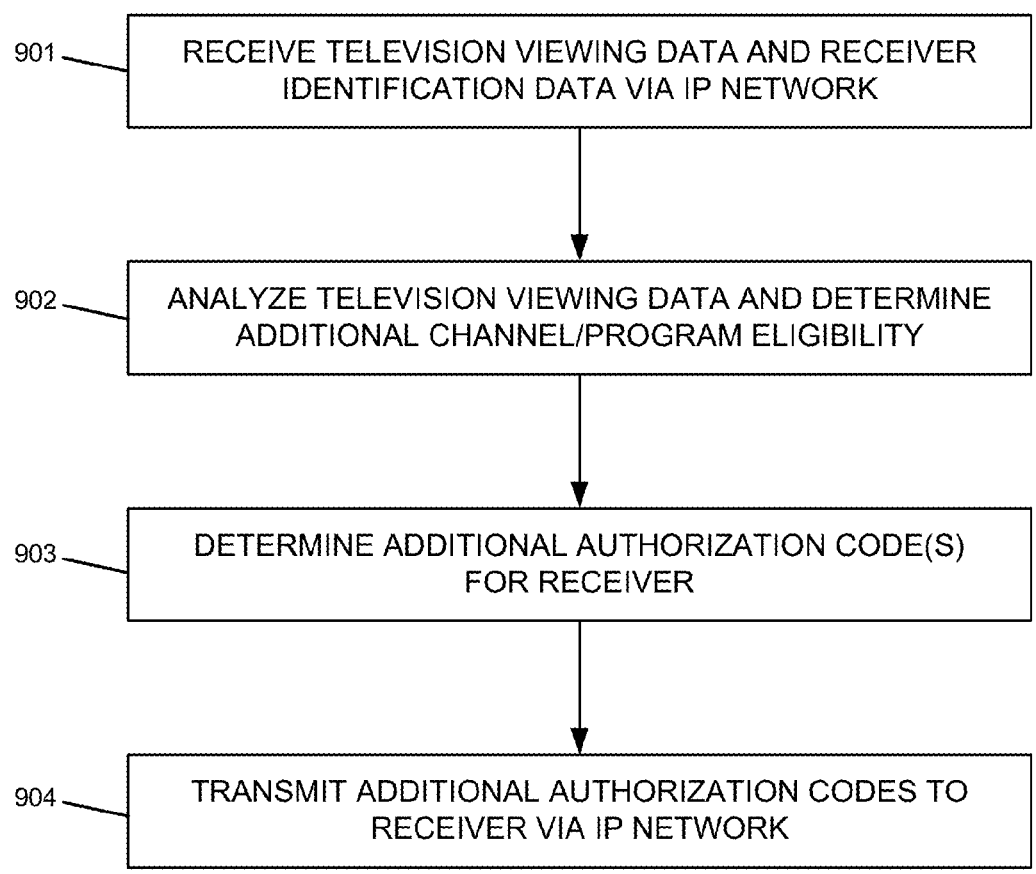
FIG. 9 is a flow diagram illustrating an example process of determining and transmitting additional authorization codes to a satellite or cable television receiver via an Internet Protocol network, based on television viewing data received from the television receiver, according to one or more embodiments of the disclosure.

Referring now to FIGS. 8 and 9, two flow diagram are shown illustrating another process of updating the authorization of a television receiver 130 via an Internet Protocol network 115. Specifically, this example illustrates an example process of updating the authorization codes/programming of a television receiver 130, based on television viewing data collected by the receiver 130. As with FIGS. 4 and 5, discussed above, the steps in FIGS. 8 and 9 may be performed respectively by a cable or satellite television receiver 130 (FIG. 8), and by a backend server (e.g., 111 and/or 121) of a television provider (FIG. 9). However, in other embodiments, different combinations of devices may be used to perform the steps described below. For example, a user device 160 separate from the receiver 130 may be used for collecting, analyzing, and/or transmitting television viewing data in some embodiments. Additionally, it should be understood that the techniques described herein for updating the authorization data at television receiver 130 via IP network 115, based on television viewing data, need not be limited to the specific systems and hardware implementations described above in FIGS. 1-3, but may be performed within other computing environments comprising other combinations of hardware and software components.

In step 801, the television receiver 130 may collect and analyze the television viewing behaviors of users at the receiver 130 (and/or other associated receivers 130 or locations). The television viewing behaviors collected by the receiver 130 may include, for example, the specific television channels and programs watched by users via the receiver 130, the types/categories of channels and programs watched by users (e.g., sports, movies, news, music, comedy shows, dramas, etc.), the times at which users watched television, and the amounts of television watched during various time periods. In various different embodiments, receivers 130 may collect different combinations of these television viewing behaviors. Additionally, television viewing behavior data may be collected and aggregated for all users of a particular receiver 130, or may be collected and analyzed separately for different users sharing the same receiver 130.

In some cases, television providers 110 and 120 may determine which types of television viewing behaviors are relevant, and may transmit instructions to receiver 130 to collect the particular relevant viewing behaviors. In other cases, receivers 130 may be configured to collect and transmit all viewing behavior data to television providers 110 and 120, which may analyze the data to identify the relevant viewing behaviors. The analysis of the television viewing behavior, which may be performed by the television providers 110 and 120, the receiver 130 itself, or a combination of components, may include analyzing the television viewing data collected by the receiver 130 to determine viewing summary data, identify viewing patterns, viewing trends, etc. Additionally, the analysis of the data may include determining different viewing summaries, patterns, trends, and the like, for specific users, specific viewing times, specific presentation devices 150, for live versus delayed viewing, etc.

In step 802, the receiver 130 may transmit the television viewing behavior data collected and/or analyzed in step 801 to one or more backend servers (e.g., 111 and/or 121) via the IP network 115. As noted above, in various different embodiments, the analysis of the television viewing data may be performed by the receiver 130 itself, or by the television service providers 110 and 120, or by a combination of these devices/systems. Therefore, in step 802, the television viewing data transmitted to the television service providers 110 and 120 may include raw television viewing behavior data, and/or television viewing summary/pattern/trend data determined by the receiver 130. Additionally, in some cases, receivers 130 may be configured/programmed to periodically transmit viewing data to the television service providers 110 and 120 (e.g., each hour, each day, each week, etc.). In other cases, receivers 130 may transmit specific television viewing data in response to a specific trigger consider (e.g., the viewing a particular television channel/program, the determination that a television viewing channel/program/time threshold has been exceeded, the determination of a television viewing pattern or trend, etc.).

Along with the television viewing data, in some embodiments the receiver 130 also may transmit receiver identification data to the backend servers 111 and 121 in step 802. Both the television viewing data and the receiver identification data may be transmitted via the IP network 115, using techniques similar or identical to those discussed above in reference to steps 402 and 602. For example, step 802 may include detecting and establishing a connection to the IP network 115, and retrieving and transmitting the receiver identification data along with the television viewing data. The data in step 802 may be transmitted by the receiver 130, or by a user device 160, and may be transmitted over the IP network 115 as encrypted data and/or using secure network communication techniques and protocols, as discussed above.

Referring now briefly to FIG. 9, steps 901-904 may correspond to the portion of the process performed by a backend server (e.g., 111 and/or 121), after receiving television viewing data from a receiver 130 in step 802. For example, in step 901, a backend server 111 may receive television viewing data and receiver identification data from a satellite television receiver 130.

In step 902, the backend server 111 (and/or other servers/systems of the television provider 110) may analyze the television viewing data (e.g., particular channels/programs viewed, viewing patterns/trends/etc.), as well as the customer account data associated with the receiver 130 (e.g., current subscription package, previous packages, video-on-demand and pay-per-view histories, account demographic data, etc.) in order to determine whether the customer is eligible to receive additional channels or programs from the television provider 110. In some cases, based on the television viewing data and/or customer account data, the television provider 110 may offer particular channels or programs to the customer temporarily as part of a promotion, customer incentive program, etc. For example, a television provider 110 may decide to provide any customer that regularly watches a particular television program with temporary access to another similar program on a restricted channel. As another example, television provider 110 may decide to offer a discount on a sports channel package (and/or temporarily offer the package for free) to customer that has a pattern of watching sports programs. As still another example, television provider 110 may provide a complementary pay-per-view movie to a customer as part of a reward or incentive program (e.g., based on the customer's viewing patterns or trends, account status, account longevity, prompt payment history, etc.). It should be understood that these examples are illustrative and non-limiting, and that many other examples are possible of determining eligibility for television channels/programs based on customer account data and/or television viewing data.

In step 903, the servers/systems of the television provider 110 may determine one or more additional authorization codes corresponding to the channels/programs identified in step 902. The determination of authorization codes in step 903 may be similar or identical to the determination of authorization codes in step 503, discussed above. For example, one or more servers/systems of the television provider 110 may retrieve the authorization code(s) from an authorization code data store corresponding to the television channels/programs determined in step 902. In some cases, the authorization code(s) may be generated on-the-fly based on the determined channels/programs, as well as various other factors, such as the specific receiver device type, receiver components/features, the geographic region at which the receiver 130 is installed, the type of communication network(s) and network hardware to which the receiver 130 is connected, the number of receivers at the customer's location, etc. Additionally, in some embodiments, the authorization codes may be encrypted using encryption key data based on the receiver identification data (e.g., receiver number, smart card number, network identifier, geographic region identifier, etc.) so that an authorization code intended for a particular receiver device 130 cannot be intercepted and used by a different receiver device 130 at a different location and/or on a different network.

In step 904, the backend server 111 may transmit the additional authorization codes back to the receiver 130 via the IP network 115. The transmission of authorization codes back to the receiver 130 in step 903 may be similar or identical to the transmission of authorization codes in step 503, discussed above. For example, the authorization codes (e.g., ECMs) may be transmitted over the IP network 115, using some or all of the encryption and secure network communication techniques and protocols described above.

Returning to FIG. 8, in step 803, the receiver 130 may receive the additional authorization codes from the backend servers 111 and/or 121 via the IP network 115, and in step 804 the receiver 130 may use the additional authorization codes to program (or re-program) various components of receiver. In some embodiments, receiving and programming updated authorization codes by the receiver 130 may be similar or identical to the processes of receiving and programming an initial set of authorization codes described above in steps 403 and 404, and/or receiving and programming an updated set of authorization codes described above in steps 603 and 604. For example, the additional authorization codes (e.g., ECMs), corresponding to sets of television channels and/or programs to be provided to the customer may be received in step 803 over IP network 115, optionally using some or all of the same encryption and secure network communication techniques described above. In step 804, the receiver 130 may use the additional authorization codes to program smart card 322 and/or various other receiver components, such as the demultiplexer 320, descrambling engine 324, audio/video decoder 326, etc.

In step 805, after the receiver 130 has been programmed/configured using the additional authorization codes in step 804, the receiver 130 may receive satellite and/or cable television signals respectively via networks 116 and/or 117. In step 806, the receiver 130 may descramble and output those television signals for which the receiver 130 is authorized to receive, to one or more presentation devices 150. Thus, in some embodiments, receiving, demultiplexing, descrambling, decoding, and outputting authorized program content by the receiver 130 may be similar or identical to the processes described in steps 405 and 406 (or 605 and 606), discussed above.

Thus, the examples shown in FIGS. 8 and 9 illustrate processes by which a receiver 130 may receive updated authorization codes (and thus updated channel/program descrambling and decoding capabilities) from a backend server 111 or 121 over an IP network 115, based on television viewing data collected by the receiver 130. As noted above, these examples may allow television providers 110 and 120 to offer particular channels and/or programs to customers as part of a promotion, customer incentive program, etc. Thus, in contrast to free channel promotions occasionally provided to television customers via satellite and cable networks 116 and 117, the specific promotions, offers, and other determinations described above in FIGS. 8 and 9 may be performed via separate IP network 115 communication, allowing them to be targeted and directed to specific customers based on those customers' viewing data and/or customer account data, rather than distributed uniformly to large numbers of customers via satellite and cable networks 116 and 117.

Figure 10:
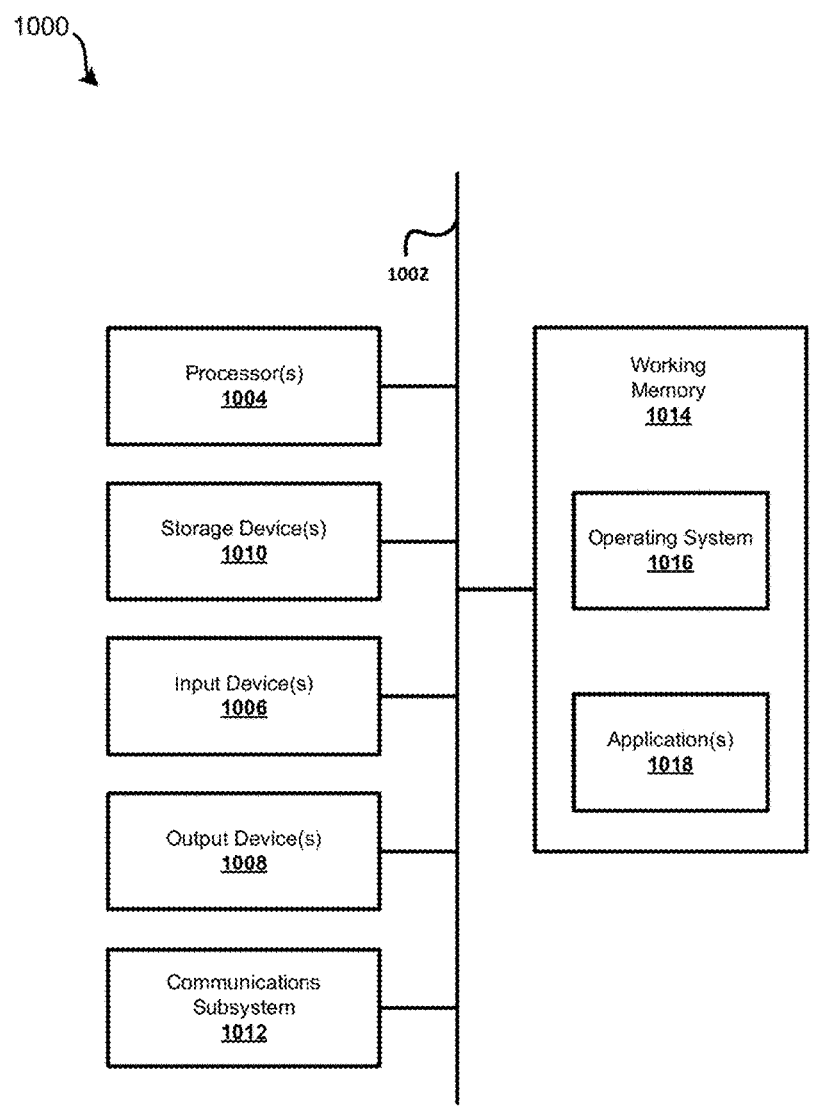
FIG. 10 is a block diagram illustrating an example computing system upon which various features of the present disclosure may be implemented.

Referring now to FIG. 10, an example is shown of a computer system or device 1000 in accordance with the disclosure. Examples of computer systems or devices 1000 may include systems, controllers, monitors, or the like, an enterprise server, blade server, desktop computer, laptop computer, tablet computer, personal data assistant, smartphone, gaming console, set-top box, television receiver, and/or any other type of machine configured for performing calculations. Any particular one of the previously-described computing devices may be wholly or at least partially configured to exhibit features similar to the computer system 1000, such as a television receiver 130, television provider servers and systems 110 and 120, and/or any of the respective elements or components of at least FIGS. 1-3. In this manner, any of one or more of the respective elements of those figures may be configured and/or arranged, wholly or at least partially, for implementing the various television receiver authorization functionality discussed above. Still further, any of one or more of the respective elements of at least FIGS. 1-3 may be configured and/or arranged to include computer-readable instructions that, when executed, instantiate and implement various functionality described herein (e.g., one or more receiver authorization engines 140 and/or services 240).

The computer device 1000 is shown comprising hardware elements that may be electrically coupled via a bus 1002 (or may otherwise be in communication, as appropriate). The hardware elements may include a processing unit with one or more processors 1004, including without limitation one or more general-purpose processors and/or one or more special-purpose processors (such as digital signal processing chips, graphics acceleration processors, and/or the like); one or more input devices 1006, which may include without limitation a remote control, a mouse, a keyboard, and/or the like; and one or more output devices 1008, which may include without limitation a presentation device (e.g., television), a printer, and/or the like.

The computer system 1000 may further include (and/or be in communication with) one or more non-transitory storage devices 1010, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1000 might also include a communications subsystem 1012, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1012 may permit data to be exchanged with a network (such as the network described below, to name one example), other computer systems, and/or any other devices described herein. In many examples, the computer system 1000 will further comprise a working memory 1014, which may include a random access memory and/or a read-only memory device, as described above.

The computer device 1000 also may comprise software elements, shown as being currently located within the working memory 1014, including an operating system 1016, device drivers, executable libraries, and/or other code, such as one or more application programs 1018, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1010 described above. In some cases, the storage medium might be incorporated within a computer system, such as computer system 1000. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1000) to perform methods in accordance with various examples of the disclosure. According to a set of examples, some or all of the procedures of such methods are performed by the computer system 1000 in response to processor 1004 executing one or more sequences of one or more instructions (which might be incorporated into the operating system 1016 and/or other code, such as an application program 1018) contained in the working memory 1014. Such instructions may be read into the working memory 1014 from another computer-readable medium, such as one or more of the storage device(s) 1010. Merely by way of example, execution of the sequences of instructions contained in the working memory 1014 may cause the processor(s) 1004 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 1000, various computer-readable media might be involved in providing instructions/code to processor(s) 1004 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1010. Volatile media may include, without limitation, dynamic memory, such as the working memory 1014.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1004 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1012 (and/or components thereof) generally will receive signals, and the bus 1002 then might carry the signals (and/or the data, instructions, etc. carried by the signals) to the working memory 1014, from which the processor(s) 1004 retrieves and executes the instructions. The instructions received by the working memory 1014 may optionally be stored on a non-transitory storage device 1010 either before or after execution by the processor(s) 1004. It should further be understood that the components of computer device 1000 can be distributed across a network. For example, some processing may be performed in one location using a first processor while other processing may be performed by another processor remote from the first processor. Other components of computer system 1000 may be similarly distributed. As such, computer device 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A satellite television system, comprising:
a satellite television provider server system, comprising:
one or more processors; and
memory communicatively coupled with and readable by the one or more processors and having stored therein processor-readable instructions which, when executed by the one or more processors, cause the satellite television provider server system to:
receive, over an Internet Protocol network, receiver identification data from a satellite television receiver device, the receiver identification data comprising (1) one or more identifiers of the satellite television receiver device, (2) data identifying an installation environment of the satellite television receiver device at a customer location, and (3) a smart card identifier associated with one or more users, wherein the receiver identification data is transmitted automatically in response to the satellite television receiver device detecting establishment of a connection with the Internet Protocol network, and not in response to an express user command;
determine, by a backend server of the satellite television provider server, a television subscription associated with the satellite television receiver device and a first authorization code associated with the satellite television receiver device, based on the one or more identifiers of the satellite television receiver device and on the smart card identifier associated with the one or more users;
determine encryption key data based at least on the data identifying the installation environment of the satellite television receiver device at the customer location and on the one or more identifiers of the satellite television receiver device;
encrypt the first authorization code associated with the satellite television receiver device, using the determined encryption key data;
transmit the encrypted first authorization code to the satellite television receiver device over the Internet Protocol network;
transmit, to the satellite television receiver device via a television communication network different from the Internet Protocol network, a transponder data stream including a plurality of television channels and a common Entitlement Control Message (ECM), wherein the plurality of television channels is authorized to be decoded by the satellite television receiver device in accordance with determining a match between the encrypted first authorization code and the common ECM;
receive, subsequent to transmitting the encrypted first authorization code, television viewing behavior data including viewing patterns generated by the satellite television receiver device according to a plurality of television programs previously viewed by the one or more users via the satellite television receiver device;
determine a second authorization code to temporarily authorize decoding, by the satellite television receiver device, of at least one additional television channel other than the plurality of television channels, the at least one additional television channel identified based on the television viewing behavior data; and
transmit the second authorization code to the satellite television receiver device over the Internet Protocol network.

2. The satellite television system of claim 1, wherein determining the first authorization code associated with the satellite television receiver device comprises:
determining a satellite television account based on the receiver identification data;

determining the television subscription as associated with the satellite television account; and determining the first authorization code based on the television subscription.

3. The satellite television system of claim 1, wherein the receiver identification data comprises a unique receiver number associated with the satellite television receiver device.

4. The satellite television system of claim 1, wherein the receiver identification data is transmitted over the Internet Protocol network via a secure transmission protocol.

5. The satellite television system of claim 1, the memory of the satellite television provider server system having stored therein further processor-readable instructions which, when executed by the one or more processors, cause the satellite television provider server system to:

determine one or more computer network identifiers associated with the installation environment of the satellite television receiver device at the customer location; and determine, based on the one or more computer network identifiers, a geographic region in which the satellite television receiver device is installed, wherein the encryption key data is determined based on the geographic region in which the satellite television receiver device is installed.

6. The satellite television system of claim 1, wherein the data identifying the installation environment comprised at least one of a network identifier or a geographic region identifier of the installation environment of the satellite television receiver device.

7. A method, comprising:

transmitting receiver identification data, by a satellite television receiver device installed within a particular network environment at a customer location, to a backend computer server of a satellite television provider, over an Internet Protocol network, the receiver identification data comprising (1) one or more identifiers of the satellite television receiver device, (2) data identifying an installation environment of the satellite television receiver device at the customer location, and (3) a smart card identifier associated with one or more users, wherein the receiver identification data is transmitted automatically in response to the satellite television receiver device detecting establishment of a connection with the Internet Protocol network, and not in response to an express user command;

receiving, by the satellite television receiver device, a first encrypted authorization code from the backend computer server over the Internet Protocol network, wherein the first encrypted authorization code is determined by the backend computer server based on the one or more identifiers of the satellite television receiver device and on the smart card identifier associated with the one or more users by:

determining a television subscription associated with the satellite television receiver device and a first authorization code associated with the satellite television receiver device, based on the one or more identifiers of the satellite television receiver device and on the smart card identifier associated with the one or more users, determining an encryption key data based at least on the data identifying the installation environment of the satellite television receiver device at the customer location and on the one or more identifiers of the satellite television receiver device, encrypting the first authorization code associated with the satellite television receiver device using the determined encryption key data, and transmitting the encrypted first authorization code to the satellite television receiver device over the Internet Protocol network;

determining, by the satellite television receiver device, a decryption key for the first encrypted authorization code, based on the data identifying the installation environment of the satellite television receiver device at the customer location;

decrypting, by the satellite television receiver device, the first encrypted authorization code, using the determined decryption key;

using the decrypted first authorization code to program a smart card of the satellite television receiver device to decode and output a satellite subscription channel package;

receiving, by the satellite television receiver device via a television communication network different from the Internet Protocol network, a transponder data stream including a plurality of television channels and a common Entitlement Control Message (ECM), wherein the plurality of television channels is authorized to be decoded by the satellite television receiver device in accordance with determining a match between the first encrypted authorization code and the common ECM;

using the smart card of the satellite television receiver device to decode and output a subset of the plurality of television channels;

transmitting, by the satellite television receiver device to the backend computer server, subsequent to the decrypting, television viewing behavior data including viewing patterns generated by the satellite television receiver device according to a plurality of television programs previously viewed by the one or more users via the satellite television receiver device;

receiving, by the satellite television receiver device from the backend computer server, a second authorization code to temporarily authorize decoding, by the satellite television receiver device, of at least one additional television channel not part of the satellite subscription channel package, the second authorization code generated by the backend computer server by identifying the at least one additional television channel based on the television viewing behavior data;

receiving, by the satellite television receiver device subsequent to receiving the second authorization device, a satellite television broadcast from the satellite television provider comprising the at least one additional television channel; and using the smart card of the satellite television receiver device to decode and output the at least one additional television channel.

8. The method of claim 7, wherein the receiver identification data comprises a unique receiver number associated with the satellite television receiver device.

9. The method of claim 7, further comprising:

determining location data associated with the satellite television receiver device;

determining a geographic region identifier of the installation environment of the satellite television receiver device, based on the determined location data; and transmitting the geographic region identifier to the backend computer server of the satellite television provider, within the receiver identification data, wherein the received first encrypted authorization code is based at least in part on the geographic region identifier.

10. The method of claim 7, further comprising:
receiving input at the satellite television receiver device, the input including network access credentials for one or more wireless networks available within the particular network environment into which the satellite television receiver device is installed at the customer location; and
establishing a connection with the one or more wireless networks using the network access credentials.

11. The method of claim 7, wherein the transmission of the receiver identification data is performed during a set-up process of the satellite television receiver device, and not in response to an express user command.

12. A method comprising:
receiving, by a computer server at a satellite television provider and from a satellite television receiver device, receiver identification data over an Internet Protocol network, the receiver identification data comprising (1) one or more identifiers of the satellite television receiver device, (2) data identifying an installation environment of the satellite television receiver device at a customer location, and (3) a smart card identifier associated with one or more users, wherein the receiver identification data is transmitted automatically in response to the satellite television receiver device detecting establishment of a connection with the Internet Protocol network, and not in response to an express user command;
determining, by the computer server, a television subscription associated with the satellite television receiver device and a first authorization code associated with the satellite television receiver device, based on the one or more identifiers of the satellite television receiver device and on the smart card identifier associated with the one or more users;
determining, by the computer server, encryption key data based at least on the data identifying the installation environment of the satellite television receiver device at the customer location and on the one or more identifiers of the satellite television receiver device;
encrypting, by the computer server, the first authorization code associated with the satellite television receiver device, using the determined encryption key data;
transmitting, by the computer server, the encrypted first authorization code to the satellite television receiver device over the Internet Protocol network, such that a plurality of television channels is authorized to be decoded by the satellite television receiver device in accordance with the encrypted first authorization code;
transmitting, to the satellite television receiver device via a television communication network different from the Internet Protocol network, a transponder data stream including a plurality of television channels and a common Entitlement Control Message (ECM), wherein the plurality of television channels is authorized to be decoded by the satellite television receiver device in accordance with determining a match between the encrypted first authorization code and the common ECM;
receiving, by the computer server subsequent to transmitting the encrypted first authorization code, television viewing behavior data including viewing patterns generated by the satellite television receiver device according to a plurality of television programs previously viewed by the one or more users via the satellite television receiver device;
determining, by the computer server, a second authorization code to temporarily authorize decoding, by the satellite television receiver device, of at least one additional television channel other than the plurality of television channels, the at least one additional television channel identified based on the television viewing behavior data; and
transmitting the second authorization code from the computer server to the satellite television receiver device over the Internet Protocol network.

13. The method of claim 12, wherein determining the first authorization code associated with the satellite television receiver comprises:
determining a satellite television account based on the receiver identification data;
determining the television subscription associated with the satellite television account; and
determining the first authorization code based on the television subscription.

14. The method of claim 12, wherein determining the first authorization code associated with the satellite television receiver comprises:
generating the first authorization code on-the-fly after receiving the receiver identification data.

15. The method of claim 12, wherein the received data identifying the installation environment comprises a network identifier associated with a network environment at which the satellite television receiver device is installed, and wherein the encryption key data is determined based on the network identifier.

16. The method of claim 12, wherein the received data identifying the installation environment comprises data indicating a type of communication network within the installation environment of the satellite television receiver device, and wherein the encryption key data is determined based on the type of communication network.

17. The method of claim 12, wherein the received data identifying the installation environment comprises data indicating one or more types of network hardware devices to which the satellite television receiver device is connected, and wherein the encryption key data is determined based on the one or more types of network hardware devices.

18. The method of claim 12, wherein the received data identifying the installation environment comprises data indicating a number of receivers installed at the customer location at which the satellite television receiver device is installed, and wherein the encryption key data is determined based on the number of receivers installed at the customer location.

19. The method of claim 12, wherein the received data identifying the installation environment comprises a geographic region identifier corresponding to a physical location at which the satellite television receiver device is installed, and wherein the encryption key data is determined based on the geographic region identifier.

* * * * *